(12) United States Patent
Blossfeld et al.

(10) Patent No.: US 7,030,325 B2
(45) Date of Patent: Apr. 18, 2006

(54) ELECTRICAL SWITCH ASSEMBLY

(75) Inventors: Mike Blossfeld, South Lyon, MI (US); John Cranick, Hartland, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/773,031

(22) Filed: Feb. 5, 2004

(65) Prior Publication Data

US 2004/0154907 A1    Aug. 12, 2004

Related U.S. Application Data

(63) Continuation-in-part of application No. 10/320,798, filed on Dec. 16, 2002.

(51) Int. Cl.
*H01H 9/30*    (2006.01)

(52) U.S. Cl. .................. 200/11 R; 200/284; 200/16 R; 439/620

(58) Field of Classification Search ............... 200/284, 200/16 R, 16 D, 302.1, 245, 246, 343, 573, 200/11 R; 439/66, 259, 620
See application file for complete search history.

(56) References Cited

U.S. PATENT DOCUMENTS

| | | | |
|---|---|---|---|
| 1,124,178 A | 1/1915 | Schroeder |
| 1,421,540 A | 7/1922 | Noll |
| 2,693,286 A | 11/1954 | Cocks |
| 2,720,989 A | 10/1955 | Wormser |
| 2,904,196 A | 9/1959 | Teixeira |
| 3,081,857 A | 3/1963 | Krueger |
| 3,203,527 A | 8/1965 | Daetwyler |
| 3,390,752 A | 7/1968 | Davidson |
| 3,393,784 A | 7/1968 | Dohanyos |
| 3,406,849 A | 10/1968 | Warren |
| 3,437,219 A | 4/1969 | Stevenson, III |
| 3,439,790 A | 4/1969 | Langley et al. |
| 3,519,775 A | 7/1970 | Weremey |
| 3,809,838 A | 5/1974 | Coppola |
| 3,869,031 A | 3/1975 | Coleman |
| 3,900,709 A | 8/1975 | Sheesley et al. |
| 3,917,086 A | 11/1975 | Sexton |
| 3,944,760 A | 3/1976 | Zdanys et al. |
| 4,089,399 A | 5/1978 | Webb |
| 4,103,926 A | 8/1978 | Johnston et al. |
| 4,147,111 A | 4/1979 | Weingarten |
| 4,277,663 A | 7/1981 | Soes |
| 4,326,110 A | 4/1982 | Zdanys, Jr. |

(Continued)

FOREIGN PATENT DOCUMENTS

EP    0 268 323    11/1987

(Continued)

*Primary Examiner*—Richard K. Lee
(74) *Attorney, Agent, or Firm*—Tarolli, Sundheim, Covell & Tummino L.L.P.

(57) ABSTRACT

An apparatus (10) includes a switch assembly (12). The switch assembly (12) includes a housing (16) and a set of contacts (14) supported by the housing. The set of contacts (14) includes a first contact (20) and a second contact (40). The first contact (20) includes a first pad portion (22) supported in the housing (16) and a first connector portion (26) protruding from the housing. The first connector portion (26) includes a compliant connector (220). The second contact (40) includes a second pad portion (42) supported in the housing (16) and a second connector portion (54) protruding from the housing. The second pad portion (42) is movable relative to and is engageable with the first pad portion (22). The second connector portion (54) includes a compliant connector (220).

27 Claims, 16 Drawing Sheets

U.S. PATENT DOCUMENTS

| | | |
|---|---|---|
| 4,508,399 A | 4/1985 | Dowling et al. |
| 4,586,778 A | 5/1986 | Walter et al. |
| 4,627,526 A | 12/1986 | Masciarelli |
| 4,636,603 A | 1/1987 | Pliml |
| 4,673,778 A | 6/1987 | Lewandowski et al. |
| 4,682,168 A | 7/1987 | Chang et al. |
| 4,731,925 A | 3/1988 | Tanishi et al. |
| 4,740,166 A | 4/1988 | Barnhouse |
| 4,774,763 A | 10/1988 | Palecek et al. |
| 4,820,111 A | 4/1989 | Godbersen |
| 4,823,927 A | 4/1989 | Jensen |
| 4,857,018 A | 8/1989 | Pickles |
| 4,875,645 A | 10/1989 | Courter |
| 4,909,378 A | 3/1990 | Webb |
| 4,930,612 A | 6/1990 | Thorndyke |
| 4,966,515 A | 10/1990 | Van Niekerk |
| 5,064,046 A | 11/1991 | Janotik et al. |
| 5,066,236 A | 11/1991 | Broeksteeg |
| 5,104,341 A | 4/1992 | Gilissen et al. |
| 5,163,223 A | 11/1992 | Wurster |
| 5,167,543 A | 12/1992 | Wurster |
| 5,176,525 A | 1/1993 | Nierescher et al. |
| 5,424,918 A | 6/1995 | Felps et al. |
| 5,963,772 A * | 10/1999 | Jost et al. .................. 419/21 |
| 6,168,469 B1 | 1/2001 | Lu |
| 6,186,843 B1 | 2/2001 | Chen et al. |
| 6,193,043 B1 | 2/2001 | Langston et al. |
| 6,204,458 B1 * | 3/2001 | Chen et al. ................. 200/284 |
| 6,312,296 B1 | 11/2001 | Jones |
| 6,371,780 B1 | 4/2002 | Aponte et al. |
| 6,422,372 B1 | 7/2002 | Ransil |
| 6,554,116 B1 | 4/2003 | Ransil |
| 6,557,800 B1 | 5/2003 | Medina et al. |
| 6,623,280 B1 | 9/2003 | Oldenburg et al. |

FOREIGN PATENT DOCUMENTS

| | | |
|---|---|---|
| EP | 0 282 122 | 2/1988 |
| JP | 54-124416 | 9/1979 |
| JP | 02-052812 | 2/1990 |

* cited by examiner

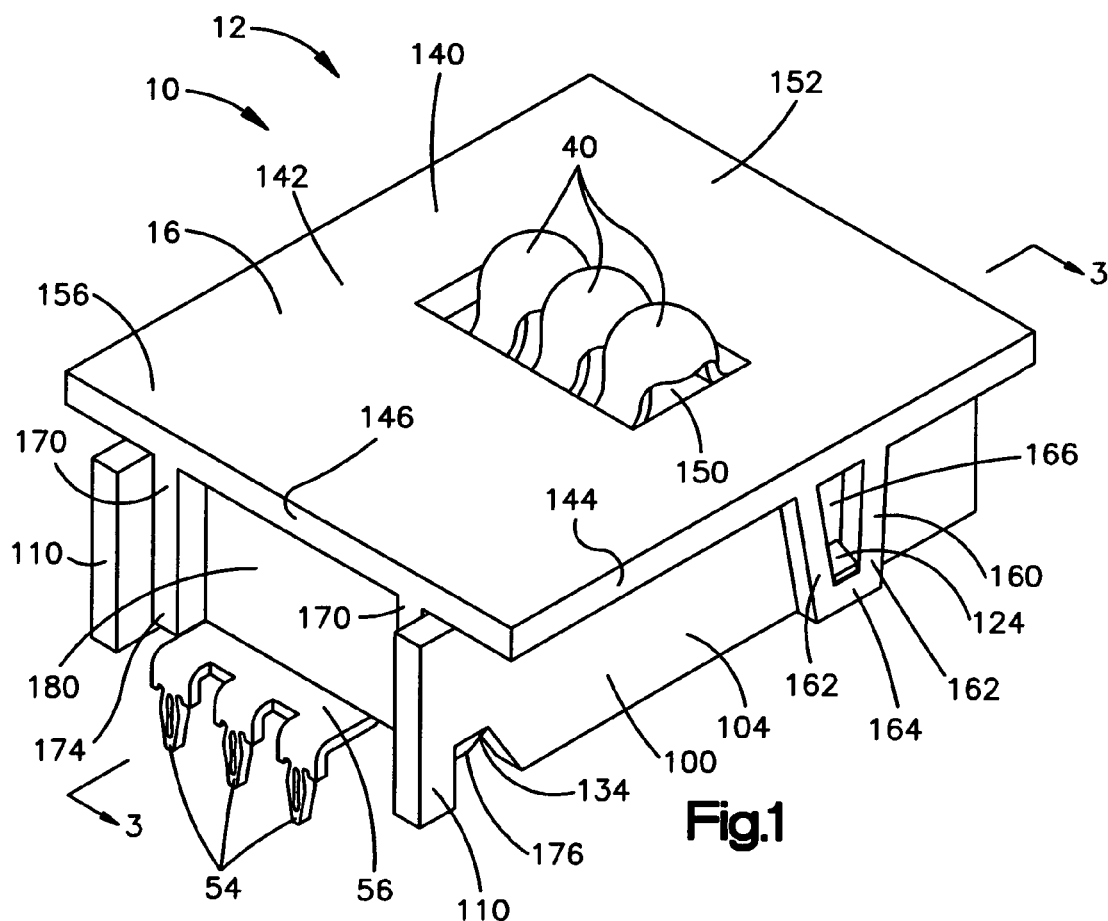
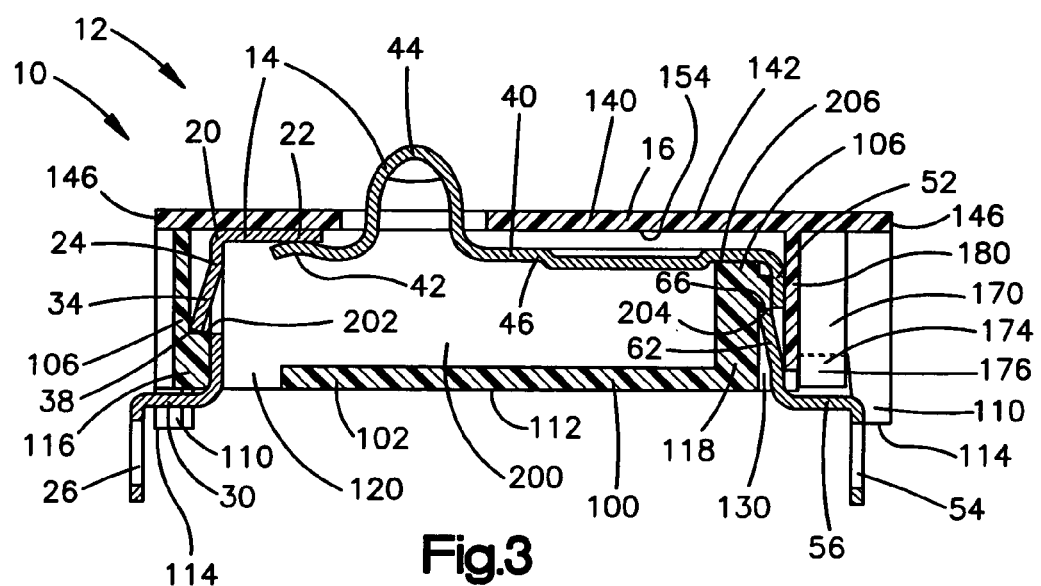

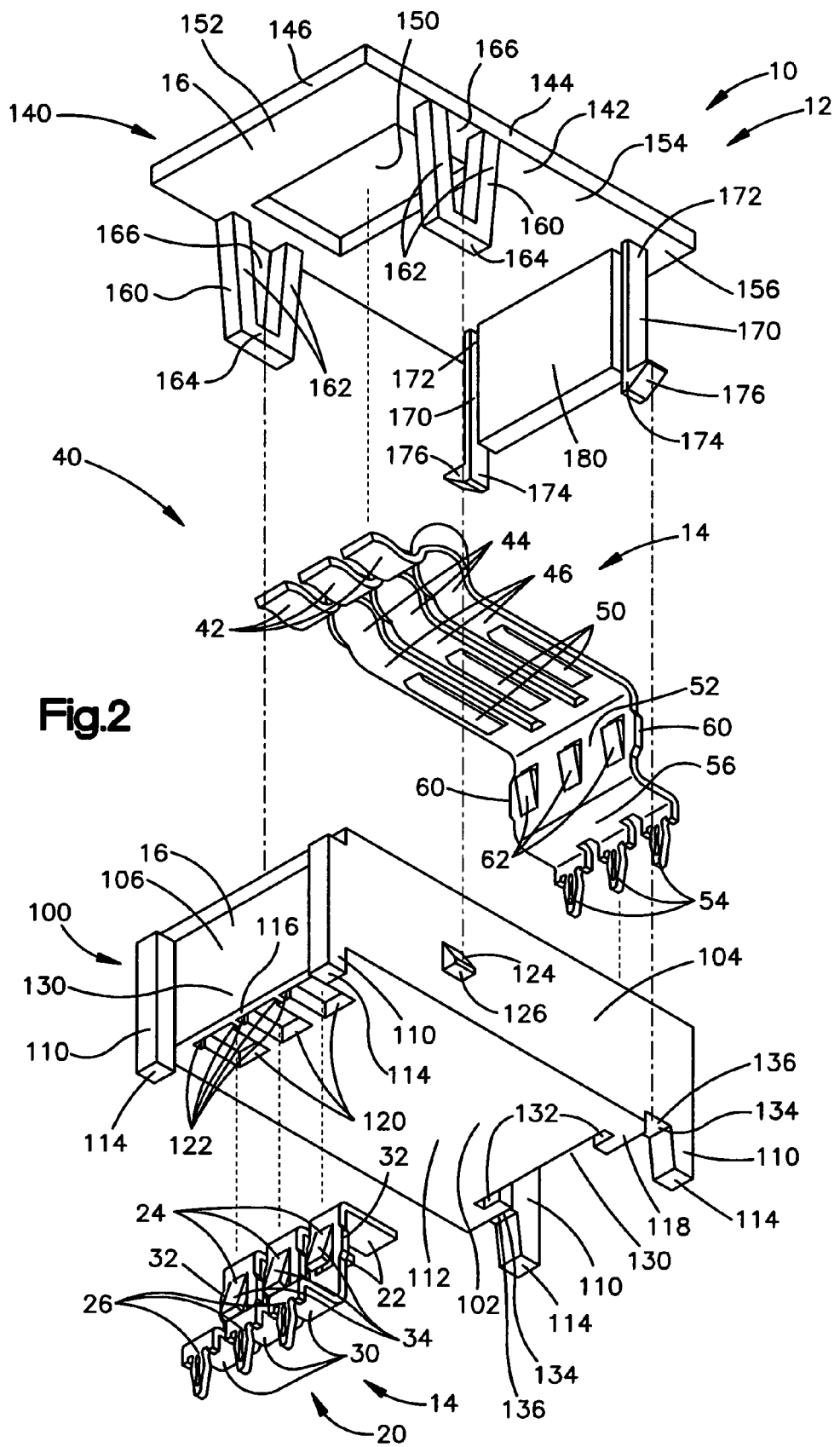

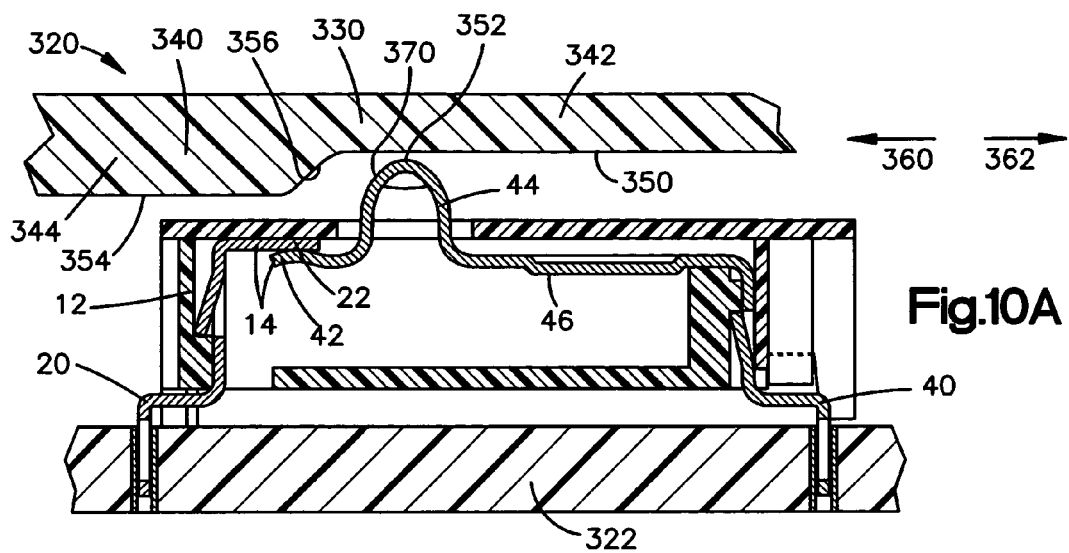
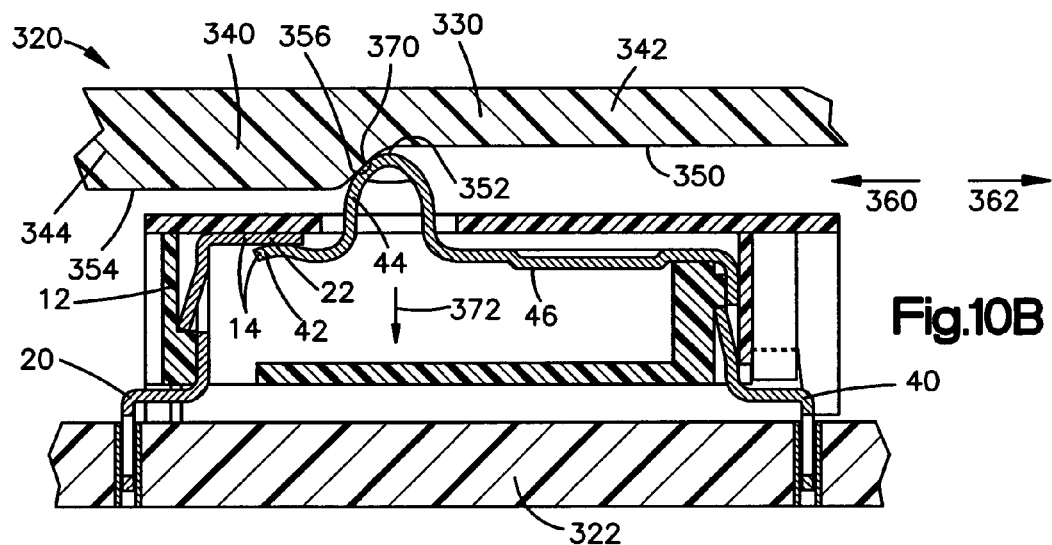
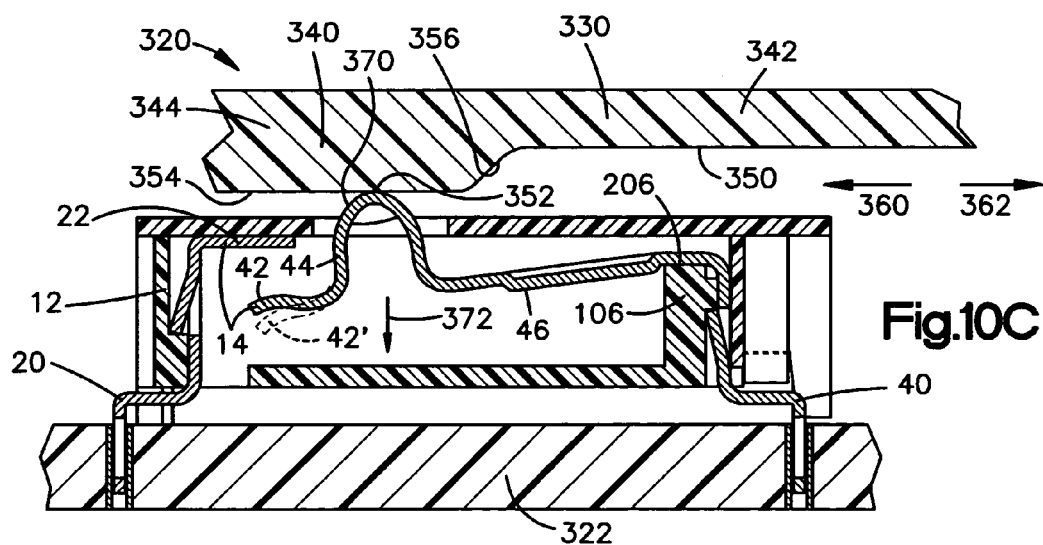

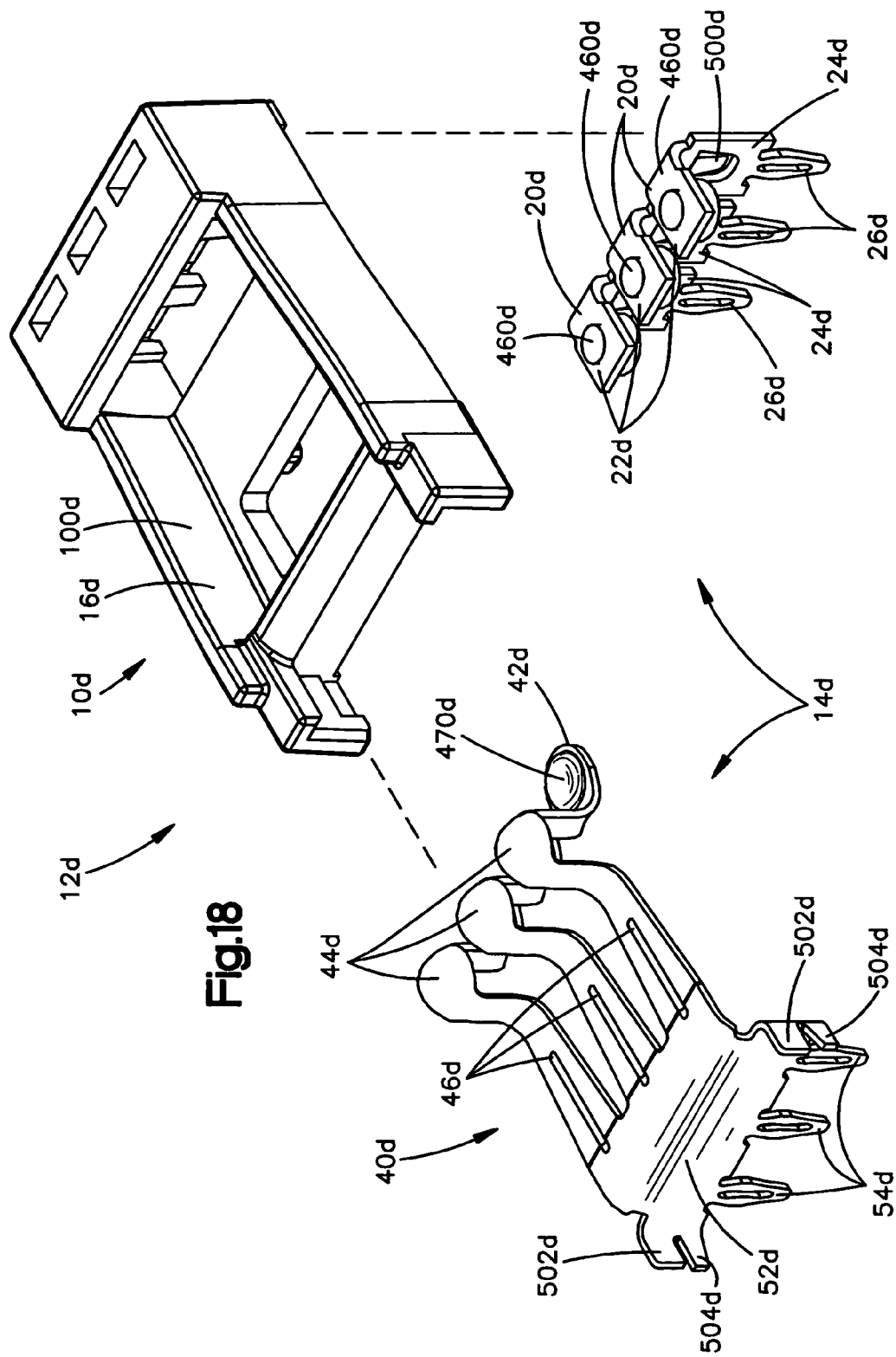

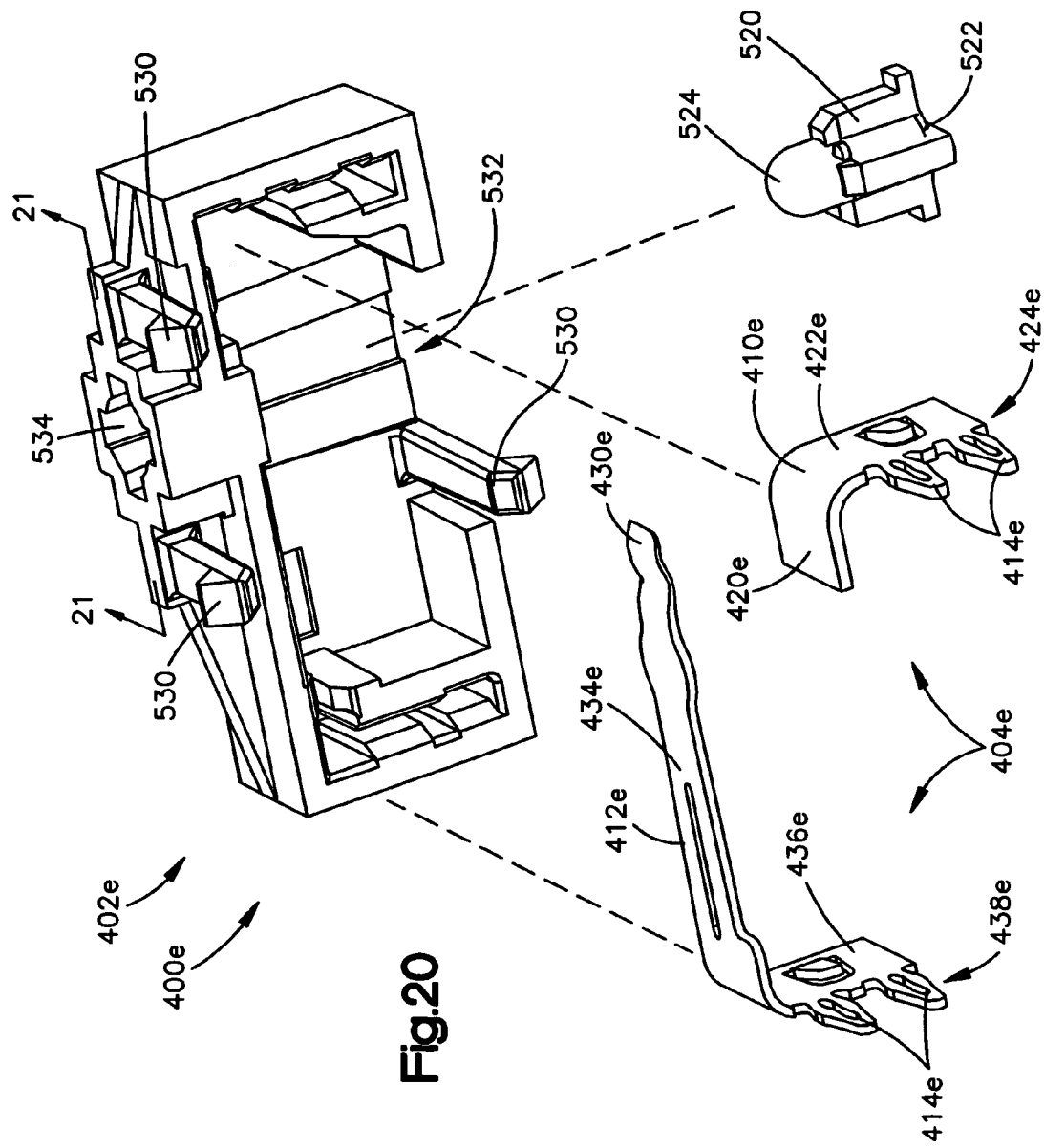

ELECTRICAL SWITCH ASSEMBLY

RELATED APPLICATION

This application is a continuation-in-part of U.S. patent application Ser. No. 10/320,798, filed on Dec. 16, 2002.

TECHNICAL FIELD

The present invention relates to an electrical switch assembly that incorporates the use of compliant connectors. In one embodiment, the present invention relates to a switch assembly including multiple contacts for providing multiplexed, encoded, or discrete input signals to a controller. In this embodiment, the switch assembly may be configured as part of a rotary selector switch for providing the input signals to the controller.

BACKGROUND OF THE INVENTION

Switches for making and breaking electrical circuits are widely known. Manually operated switches include an actuator that is manually actuatable to cause making/breaking action of switch contacts to energize/de-energize one or more electrical circuits associated with the contacts. One particular type of manually operated switch is a rotary switch in which a rotary actuator is rotatable to cause making/breaking action of the switch contacts. A rotary selector switch has a rotary actuator that is rotatable to cause making/breaking of multiple electrical contacts of the switch. This causes energizing and/or de-energizing a plurality of electrical circuits to provide a plurality of electrical signals.

SUMMARY OF THE INVENTION

An apparatus comprises a switch assembly. The switch assembly comprises a housing and a set of contacts supported by the housing. The set of contacts includes a first contact and a second contact. The first contact includes a first pad portion supported in the housing and a first connector portion protruding from the housing. The first connector portion includes a compliant connector. The second contact includes a second pad portion supported in the housing and a second connector portion protruding from the housing. The second pad portion is movable relative to and is engageable with the first pad portion. The second connector portion includes a compliant connector.

In one embodiment, the apparatus comprises a rotary switch assembly. The rotary switch assembly comprises a housing, at least one set of contacts supported by the housing, and a rotary actuator. The at least one set of contacts each comprise a first contact and a second contact. Each of the first contacts includes a first pad portion supported in the housing and a first connector portion protruding from the housing. The first connector portion comprises a compliant connector. Each of the second contacts includes a second pad portion supported in the housing and a second connector portion protruding from the housing. The second connector portion comprises a compliant connector. The second pad portion is movable relative to the first pad portion and engageable with the first pad portion. The second contact further comprises a deflectable spring portion and an actuator portion that protrudes from the housing and includes a cam surface. The rotary actuator is rotatable relative to the housing and the at least one set of contacts. The rotary actuator comprises at least one actuating portion movable upon rotation of the actuator into engagement with the cam surface to cause deflection of the spring portion and move the second pad portion relative to the first pad portion.

In another embodiment, an apparatus for controlling a vehicle device having a plurality of modes of operation comprises a printed circuit board with plated through holes electrically connected with an electrical circuit. The apparatus also comprises a controller operatively connected to the electrical circuit and operatively connected to the vehicle device and a switch assembly. The switch assembly comprises a housing, a plurality of set of contacts supported by the housing, and a rotary actuator. The sets of contacts each comprise a first contact and a second contact. Each of the first contacts includes a first pad portion supported in the housing and a first connector portion protruding from the housing. Each of the first connector portions comprising a compliant connector inserted into one of the plated through holes to electrically connect the first contacts to the electrical circuit. Each of the second contacts including a second pad portion supported in the housing and a second connector portion protruding from the housing. Each of the second connector portions comprises a compliant connector inserted into one of the plated through holes to electrically connect the second contacts to the electrical circuit. The second pad portions each are movable relative to and engageable with a corresponding one of the first pad portions. Each of the second contacts further includes a deflectable spring portion and an actuator portion that protrudes from the housing and including a cam surface. The rotary actuator is rotatable relative to the housing and the at least one set of contacts about an axis to a plurality of positions. The actuator comprises at least one actuating member movable upon rotation of the actuator into engagement with the cam surfaces to cause deflection of the spring portions and move the second pad portions relative to the first pad portions. At each of the rotary positions, the actuator actuates the sets of contacts in predetermined combinations. The controller receives signals from the switch assembly via the electrical circuit. The signals correspond to the predetermined combination and are operative to actuate the vehicle devices to one of the modes of operation according to the predetermined combination.

In another embodiment, a side actuated switch assembly includes a housing having a bottom wall and at least one side wall extending transversely from the bottom wall. A set of contacts is supported by the housing. The set of contacts includes a first contact and a second contact. The first contact includes a first pad portion supported in the housing and a first connector portion protruding from the bottom wall of the housing. The first connector portion includes a first compliant connector. The second contact includes a second pad portion supported in the housing and an actuator portion protruding from the side wall. The second pad portion is engageable with the first pad portion. The second pad portion is movable relative to the first pad portion when a force acts on the actuator portion. The second contact also includes a second connector portion protruding from the bottom wall of the housing. The second connector portion includes a second compliant connector.

In a further embodiment, a switch assembly includes a housing and first and second contacts supported in the housing. The first contact includes a compliant connector portion. A first contact pad, constructed of a precious metal alloy, is fastened to the first contact. The second contact is movable relative to the first contact and includes a compliant connector portion. A second contact pad, constructed of a precious metal alloy, is fastened to the contact.

BRIEF DESCRIPTION OF THE DRAWINGS

The foregoing and other features of the invention will become more apparent to one skilled in the art upon consideration of the following description of the invention and the accompanying drawings in which:

FIG. 1 is a perspective view of a switch assembly according to a first embodiment of the present invention;

FIG. 2 is an exploded perspective view of the switch assembly of FIG. 1;

FIG. 3 is a sectional view taken generally along line 3—3 in FIG. 1;

FIGS. 10A–10C are sectional views illustrating the operation of the rotary selector switch configuration of FIG. 9;

FIG. 18 is a perspective view of a switch assembly according to a sixth embodiment of the present invention;

FIG. 20 is a perspective view of a switch assembly according to a seventh embodiment of the present invention.

DESCRIPTION OF EMBODIMENTS

Figure 4:
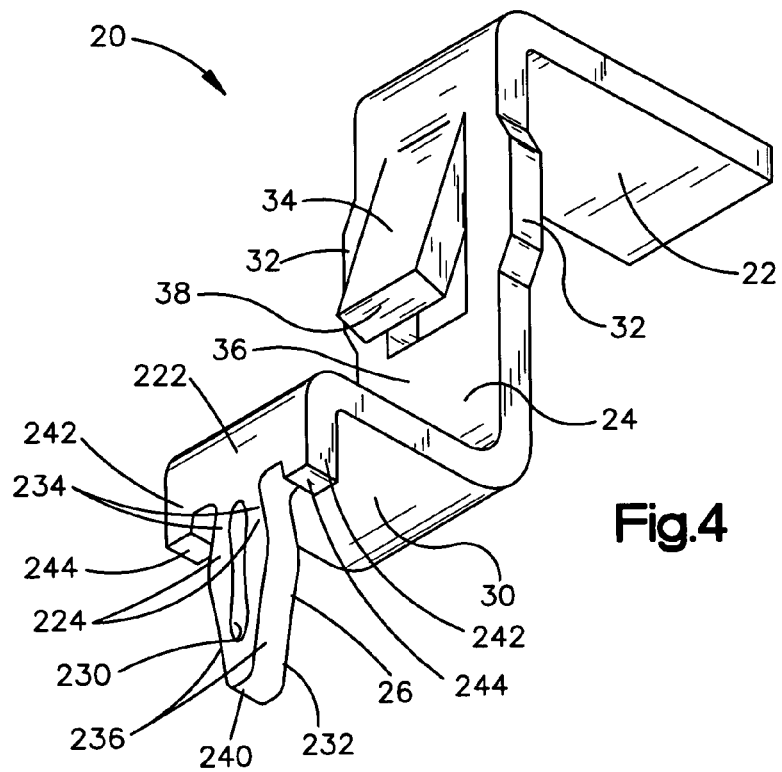
FIGS. 4 and 5 are magnified perspective views of certain components of the switch assembly of FIG. 1.

FIGS. 1–3 illustrate an apparatus 10 comprising a switch assembly 12 in accordance with a first embodiment of the present invention. In the first embodiment, the switch assembly 12 includes three sets of contacts, also referred to herein as contact sets (illustrated at 14 in FIGS. 2 and 3), supported in a housing 16. The switch assembly 12 could, however, include a greater or lesser number of contact sets 14. Each set of contacts 14 includes a first contact 20 and a second contact 40.

A first contact 20 is illustrated in FIG. 4. The first contact 20 is formed as a single piece of electrically conductive material. Examples of such electrically conductive materials are metals or alloys such as steel, copper, and aluminum. In the illustrated embodiment, the first contacts 20 are formed from a spring hard copper alloy. More particularly, the first contacts 20 are formed from generally elongated strips of a spring hard copper alloy that are stamped and bent or otherwise formed into the illustrated configuration using known means (not shown), such as a die.

The first contacts 20 include a plurality of portions formed along the length of the elongated strips of electrically conductive material used to construct the first contacts. Each first contact 20 includes a pad portion 22 located at a terminal end of the elongated strip. The pad portion 22 may be gold plated to enhance electrical conductivity. A support portion 24 extends from the pad portion 22 along the length of the elongated strip to a connector portion 26, which forms a terminal end of the elongated strip opposite the terminal end forming the pad portion 22.

In the illustrated embodiment, the support portion 24 extends from the pad portion 22 in a direction transverse to the pad portion. More particularly, the support portion 24 and pad portion 22 extend perpendicular to each other. The support portion 24 and pad portion 22 could alternatively extend at some other angle relative to each other.

Also, in the illustrated embodiment, the support portion 24 includes a flange portion 30 that comprises an end portion of the support portion opposite the pad portion 22. The flange portion 30 extends from the support portion 24 in a direction perpendicular to the support portion. The connector portion 26 extends from the flange portion 30 of the support portion 24 in a direction transverse the flange portion. In the illustrated embodiment, the connector portion 26 extends from the flange portion 30' downward as viewed in FIG. 4 in a direction perpendicular to the flange portion. The connector portion 26 could, however, extend from the flange portion 30 at a different angle. Also, it will be appreciated that the flange portion 30 could be omitted, in which case the connector portion 26 could be coextensive with or extend at an angle from the support portion 24.

The support portion 24 of each first contact 20 includes a pair of support flanges 32. The support flanges 32 project from opposite lateral edges of the support portion 24 and extend along a portion of the length of the support portion. The support portion 24 of each first contact 20 also includes a latch portion 34 that is positioned between the support flanges 32 and projects at an acute angle from a surface 36 of the support portion. The support flanges 32 and the latch portion 34 help connect the first contact 20 to the housing 16 and support the first contact in the housing, as will be discussed below in more detail.

Figure 5:
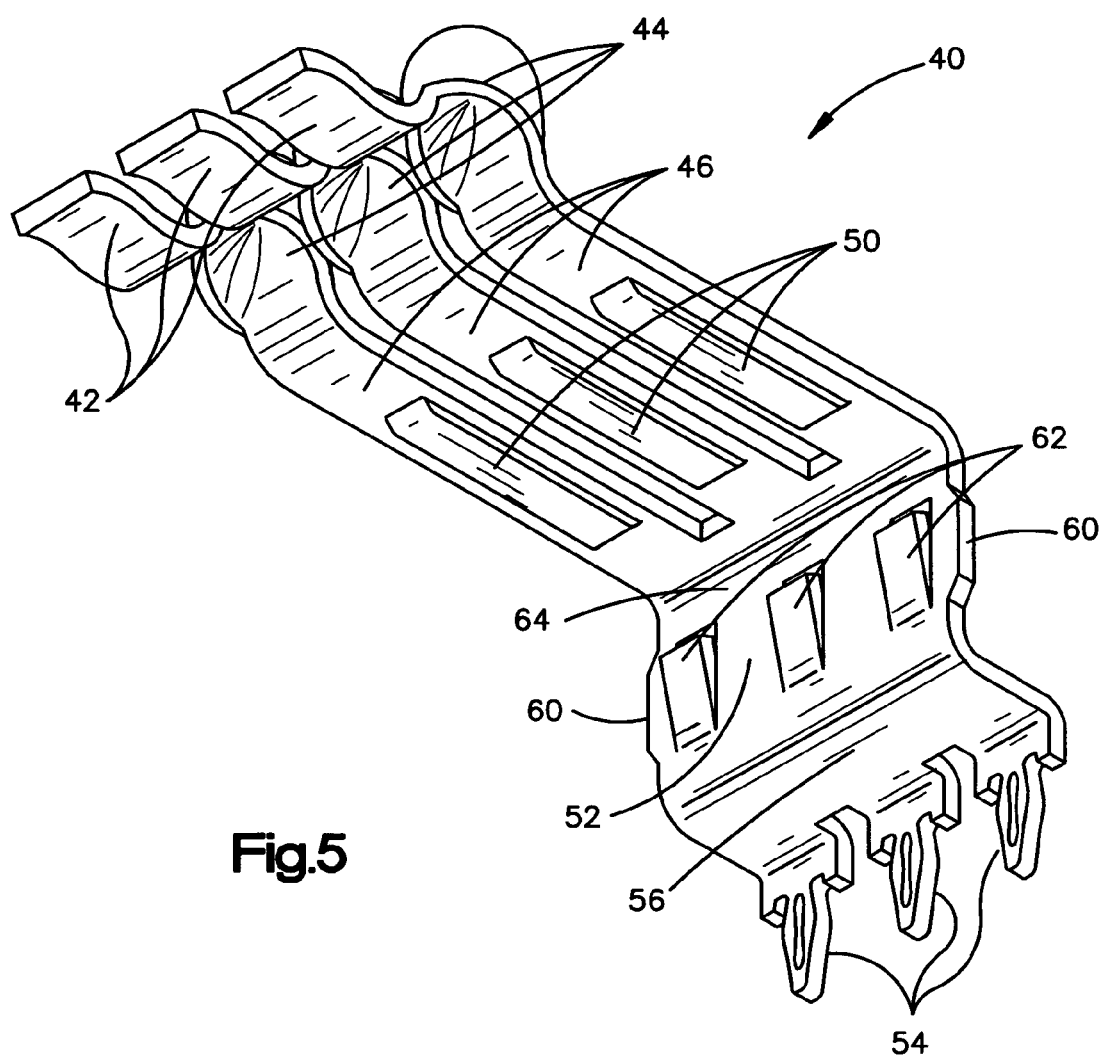

The second contacts 40 are illustrated in FIG. 5. In the illustrated embodiment, all three second contacts 40 are formed from the same single piece of electrically conductive material. The second contacts 40 could, however, be formed from three separate pieces of material, one single piece forming each of the second contacts. Examples of the electrically conductive materials used to construct the second contacts 40 are metals or alloys such as steel, copper, and aluminum. In the illustrated embodiment, the second contacts 40 are formed from a spring hard copper alloy. More particularly, the second contacts 40 are formed from a generally elongated strip of spring hard copper alloy that is stamped and bent or otherwise formed into the illustrated configuration using known means (not shown), such as a die.

The second contacts 40 include a plurality of portions formed along the length of the elongated strips of electrically conductive material used to construct the second contacts. Each second contact 40 includes a pad portion 42 located at a terminal end of the elongated strip. The pad portions 42 may be gold plated to enhance electrical conductivity. The pad portion 42 has a slightly curved configuration as viewed in FIG. 5.

An actuator portion 44 extends from the pad portion 42 in a direction generally transverse to the pad portion. The actuator portion 44 has a generally rounded or domed configuration with a convex outer cam surface 370. A spring portion 46 extends transversely from the an end of the actuator portion 44 opposite the pad portion 42 in a direction generally parallel to the pad portion. The spring portion 46 includes a recessed reinforcing portion 50 that extends along a portion of the length of the spring portion.

A support portion 52 extends from the spring portion 46 along the length of the elongated strip to a connector portion 54, which forms a terminal end of the elongated strip opposite the terminal end forming the pad portion 42. In the illustrated embodiment, the support portion 52 extends from the spring portion 46 in a direction transverse to the spring portion. More particularly, the support portion 52 and spring portion 46 extend perpendicular to each other. The support portion 52 and spring portion 46 could alternatively extend at some other angle relative to each other.

Also, in the illustrated embodiment, the support portion 52 includes a flange portion 56 that comprises an end portion of the support portion opposite the spring portion 46. The flange portion 56 extends from the support portion 52 in a direction perpendicular to the support portion and opposite the spring portion 46. The connector portion 54 extends from the flange portion 56 in a direction transverse the flange portion. In the illustrated embodiment, the connector portion 54 extends from the flange portion 56 downward as viewed in FIG. 4 in a direction perpendicular to the flange portion. The connector portion 54 could, however, extend from the flange portion 56 at a different angle. Also, it will be appreciated that the flange portion 56 could be omitted, in which case the connector portion 54 could be coextensive with or extend at an angle from the support portion 52.

The support portions 52 of the second contacts 40 are formed together and integrally with each other. This integrally formed support portion 52 includes a pair of support flanges 60 that project from opposite lateral edges of the support portion 52 and extend along a portion of the length of the support portion. The support portion 52 also includes three latch portions 62, one corresponding to each of the second contacts 40, that are positioned between the support flanges 60 and project at an acute angle from a surface 64 of the support portion. The support flanges 60 and the latch portions 62 help connect the second contacts 40 to the housing 16 and support the second contacts in the housing, as will be discussed below in more detail.

It will be appreciated that the second contacts 40 may be formed as separate pieces, in which case the support portions 52 would not be formed together and integrally with each other. In this instance, each of the second contacts 40 would be formed individually from a single elongated strip of electrically conductive material. Also, in this instance, the support portion 52 of each second contact 40 would include a pair of support flanges 60 that project from opposite lateral edges of the individual support portion 52 and extend along a portion of the length of the support portion. The individual support portion 52 of each second contact 40 would also include a latch portion 62 positioned between the support flanges 60 that projects at an acute angle from the surface 64 of the support portion. The support portions 52 of the second contacts 40 would thus have a form similar or identical to the support portions 24 of the first contacts 20 (see FIG. 4).

Referring to FIGS. 1 and 2, the housing 16 includes a base portion 100 and a cover 140. The housing 16 supports the first and second contacts 20 and 40. It will be appreciated that the base portion 100 and the cover 140 of the illustrated embodiment is one of a variety of configurations that may be used to provide support for the first and second contacts 20 and 40. The base portion 100 and/or the cover 140 of the housing 16 may have any desired configuration suited to provide the requisite support for the contacts 20 and 40. For example, the housing 16 may be constructed of a single piece of material instead of separate pieces. As another alternative, portions of the cover 140 could be omitted and remaining portions could be molded together with the base portion 100 as a single piece. As a further alternative, the cover 140 could be omitted altogether and the first and second contacts 20 and 40 could be supported by the base portion 100 alone.

In the illustrated embodiment, the housing 16 is constructed of a molded plastic material. The housing 16 could, however, have any suitable material construction.

Referring to FIGS. 1–3, the base portion 100 includes a base wall 102 that has a generally rectangular configuration. A pair of opposed side walls 104 extend from opposite longitudinal edges of the base wall 102 in a direction transverse (perpendicular) to the base wall. A pair of opposed end walls 106 extend from opposite lateral edges of the base wall 102 in a direction transverse (perpendicular) to the base wall.

The base portion 100 also includes four legs 110 that are positioned near each of the four intersections of the side walls 104 and end walls 106. The legs 110 extend vertically below a lower surface 112 of the base wall 102 as viewed in FIGS. 1–3. The legs 110 terminate at a lower foot surface 114. The foot surfaces 114 of the legs 110 are arranged to be coplanar with each other.

The base portion 100 also includes openings 120 for receiving the first contacts 20. The openings 120 extend through the base wall 102. In the embodiment illustrated in FIGS. 1–3, the base portion includes three openings 120, each for receiving one of the three first contacts 20. The openings 120 are arranged adjacent to each other and are positioned along an intersection of the base wall 102 and one of the end walls 106 at a first end 116 of the base portion 100. Each opening 120 has a generally rectangular configuration and includes a pair of opposed slots 122 spaced apart from each other on opposite side walls of the openings.

Each side wall 104 of the base portion 100 includes a latch portion 124. The latch portions 124 are positioned opposite each other and extend away from each other from an outer surface of their respective side walls 104. Each latch portion 124 includes a latch surface 126 that extends perpendicular to the outer surface of its respective side wall 104.

The end wall 106 of the base portion 100 at a second end 118 of the base portion, opposite the first end 116 of the base portion, includes a recess 130. The recess 130 extends through the base wall 102. The recess 130 includes a pair of slots 132 positioned at opposite ends of the recess.

The base portion 100 also includes a pair of latch receiving portions 134. The latch receiving portions 134 are positioned adjacent the leg portions 110 at the intersection of the base wall 102 and the end wall 106 at the second end 118 of the base portion 100. The latch receiving portions 134 take the form of notches recessed from the outer surface 112 of the base wall 102. Each latch receiving portion 130 includes a latch engaging surface 136 recessed from the outer surface 112 and extending generally parallel to the outer surface.

The cover 140 includes a generally rectangular top wall 142 having spaced longitudinally extending side edges 144 having a length about equal to the length of the side walls 104 of the base portion 100. The cover 140 also includes spaced laterally extending end edges 146 that extend between the side edges 144 and have a length about equal to the length of the end walls 106 of the base portion 100. A rectangular opening 150 extends through the top wall 142.

The cover 140 also includes a pair of connecting flaps 160 that are positioned adjacent the opening 150 near a first end portion 152 of the top wall 142. The connecting flaps 160 project downward from a lower surface 154 of the top wall 142 in a direction perpendicular to the lower surface. The flaps 160 each include opposing leg portions 162 extending from the lower surface 154 of the top wall 142 and an end portion 164 opposite the top wall. The end portion 164 extends between and connects terminal ends of the leg portions 162, thus defining an aperture 166 extending through each of the flaps 160.

The cover 140 also includes a pair of latch members 170 positioned along a second end portion 156, opposite the first end portion 152, of the top wall 142. The latch members 170 project downward from the lower surface 154 of the top wall 142 in a direction perpendicular to the lower surface. The latch members 170 each include a leg portion 172 having a first end connected to the top wall 142 and an opposite second end portion 174 that includes a latch 176. The latch 176 has a tapered configuration and extends perpendicularly outward from the leg portion 172.

The cover 140 further includes a retainer wall 180 extending perpendicularly from the lower surface 154 along the second end portion 156 of the top wall 142. The retainer wall 180 extends parallel to the end edges 146 between the larch members 170.

The base portion 100, cover 140 and first and second contacts 20 and 40 are assembled in a manner indicated generally by the dashed lines in FIG. 2 to form the assembled switch assembly 12 illustrated in FIGS. 1 and 3. The first contacts 20 are inserted into the openings 120 in the base wall 102 such that the flanges 32 are inserted into the slots 122 of their respective openings. The first contacts 20 are urged into the openings 120 and the flanges 32 are urged into the slots 122 until the latch portions 34 "snap" into place. This is best illustrated in FIG. 3.

When the latch portions 34 snap into place, a terminal end portion of the latch portion engages a latch surface 202 of the base portion 100 to help prevent the first contact 20 from backing out of the opening 120. The latch surface 202 is formed on the end wall 106 at the first end 116 of the base portion 100. At the same time, the flange portion 30 engages the outer surface 112 of the base wall 102 prevents further insertion of the first contact into the opening 120. The latch portion 34 in combination with the latch surface 202 and the flange portion 30 help retain the first contact 20 connected to the base portion 100 in the position illustrated in FIGS. 1 and 3.

The second contacts 40 are inserted into the recess 130 in the base wall 102 and end wall 106 such that the flanges 60 are inserted into the slots 132 in the recess. The second contacts 40 are urged into the recess 130 and the flanges 60 are urged into the slots 132 until the latch portions 62 "snap" into place. This is best illustrated in FIG. 3.

When the latch portions 62 snap into place, a terminal end portion 66 of the latch portion engages a latch surface 204 of the base portion 100 to help prevent the second contact 40 from backing out of the recess 130. At the same time, the spring portion 46 engages an upper surface 206 of the end wall 106 at the second end 118 of the base portion 100 and prevents further insertion of the first contact into the recess 130. The latch portion 60 in combination with the latch surface 204 and the spring portion 46 help retain the second contact 40 connected to the base portion 100 in the position illustrated in FIGS. 1 and 3.

Once the first and second contacts 20 and 40 are assembled with the base portion 100, the cover 140 brought down over the assemblage of the base portion and the first and second contacts 20 and 40 to the position illustrated in FIGS. 1 and 3. The flaps 160 are slid over opposite sides of the base portion 100 along opposite outer surfaces of the side walls 104. The flaps 160 are deflected away from the side walls 104 by an angled surface of the latch portions 124 that engages the end portion 164 of the flaps slide. Once the end portion 164 moves beyond the angled surface, the flaps 160 "snap" over the latch portions 124. The latch portions 124 extend through the apertures 166 in their respective flaps 160. The end portion 164 of each flap 160 engages the latch surface 126 of its respective latch portion 124.

The latch members 170 are slid between the leg portions 110 at the second end 118 of the base portion 100. The latch members 170 are deflected inward of the side walls 104 toward the retainer wall 180 by an angled surface of the latch 176 that engages the side walls. Once the angled surfaces move beyond the side walls 104, the latches 176 "snap" into the latch receiving portions 134 and latch against their respective latch receiving surfaces 136. The flaps 160 and the latch members 170 thus help connect the cover 140 to the base portion 100 and help maintain the switch assembly 12 in the assembled condition of FIGS. 1 and 3.

The base wall 102, side walls 104, end walls 106, and top wall 142 define an interior space 200 of the housing 16 when the cover 140 is connected to the base portion 100. The pad portion 22 of the first contact 20 and the pad portion 42 and spring portion 46 of the second contact 40 are disposed in the interior space 200. The connector portions 26 and 54 of the first and second contacts 20 and 40 protrude from the housing 16. The actuator portions 44 of the second contacts 40 project through the opening 150 in the cover 140.

The first contact 20, including the pad portion 22, support portion 24, and connector portion 26, is supported in a fixed position in the housing 16. The support portion 52 and the connector portion 54 of the second contact 40 are supported in a fixed position in the housing 16. The support portion 52 is positioned between the retainer wall 180 and the end wall 106 at the second end 118 of the base portion 100. A portion of the spring portion 46 of the second contact 40 adjacent the intersection of the spring portion and the support portion 52 rests on the top surface 206 of the end wall 106 at the second end 118.

The end wall 106 upon which the spring portion 46 rests serves as a support or fulcrum for the spring portion. The spring portion 46 is deflectable in response to a force acting on the spring portion. When this occurs, the spring portion 46 deflects, i.e., bends, which causes the actuator portion 44 and pad portion 42 to move with the spring portion. The actuator portion 44 and pad portion 42 move in a generally arcuate path about the fulcrum, i.e., the end wall 106 at the second end 118 of the base portion 100 upon which the spring portion 46 rests.

When the switch assembly 12 is in the assembled condition of FIGS. 1 and 3, the contacts touch each other. The spring bias of the spring portion 46 urges the pad portion 42 of the second contact 40 into engagement with the pad portion 22 of the first contact 20. Thus, in the normally closed configuration illustrated in FIGS. 1 and 3, the contact force that maintains the first and second contacts in the normally closed condition is self-contained or resides in the switch assembly 12 itself and no outside force is required to make the contacts 14.

According to the present invention, the connector portions 26 and 54 comprise what are referred to in the art as "compliant connectors." Compliant connectors are used to connect electrical components to mounting bodies, such as printed circuit boards, without the use of solder in making the connection. A compliant connector 220 representative of the connector portion 26 of the first contacts 20 and the connector portion 54 of the second contacts 40 is illustrated in FIG. 6.

Figure 6:
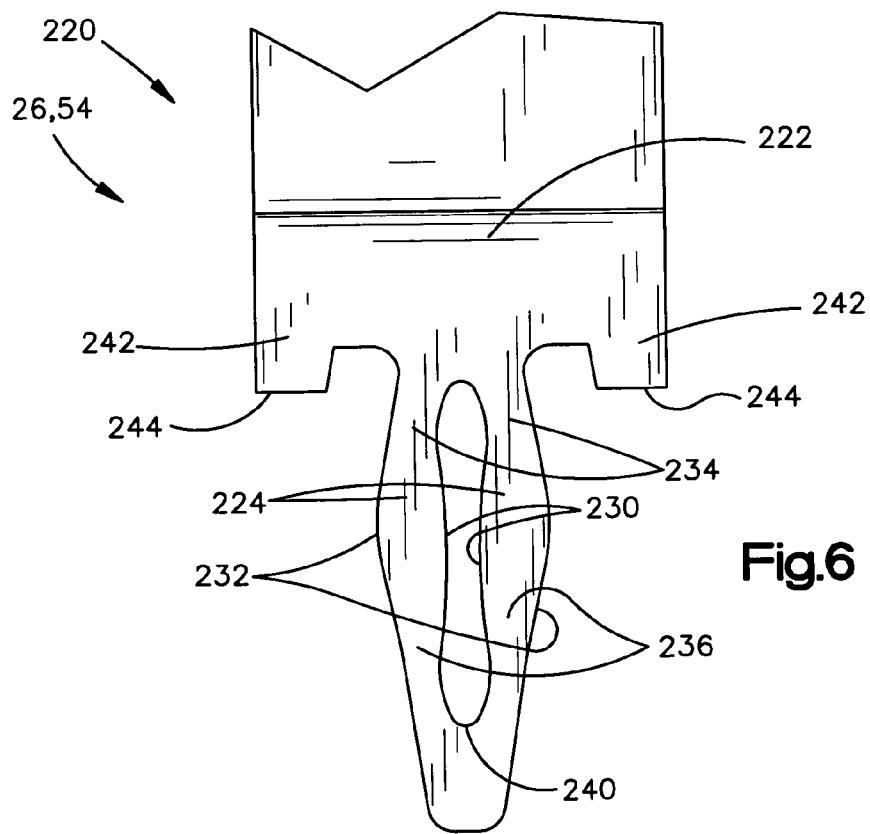
FIG. 6 is a magnified view of a portion of the components of FIGS. 4 and 5.

Referring to FIG. 6, the compliant connector 220 of the illustrated embodiment includes a cross member 222 and a pair of retainer members 224 extending transversely from the cross member. Each retainer member 224 has an inner surface 230 and an opposite outer surface 232. The inner surfaces 230 are presented toward each other. The retainer members 224 have a curved or contoured configuration wherein first portions 234 of the retainer members extend from the cross member 222 away from each other at an acute angle. Second portions 236 of the retainer members extend toward each other at an acute angle and intersect at a terminal end 240 of the compliant connector 220. The retainer members 224 thus form an aperture 242 across which the inner surfaces 230 of the retainer members are presented toward each other. The inner surfaces 230 have a curved configuration that provide the aperture 242 with the resemblance of a needle eye.

The cross member 222 includes a pair of leg portions 242 that extend downward as viewed in FIG. 6 in the same general direction as the retainer members 224. The leg portions 242 are positioned at opposite ends of the cross member 222 and on opposite sides of the retainer members 224. The leg portions 242 have a generally tapered configuration and terminate at a lower end surface 244 adjacent about a middle portion of the first portions 234 of the retainer members 224.

Figure 7A:
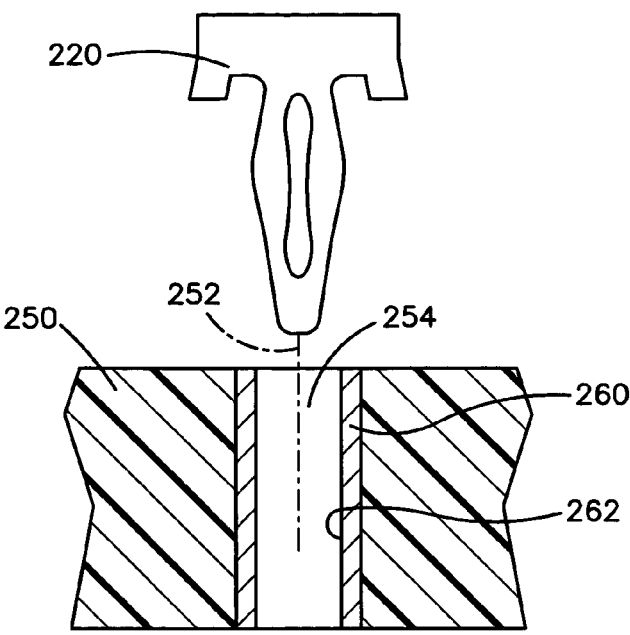
FIGS. 7A–7C are magnified elevation views illustrating the installation of the portion of FIG. 6.
Figure 7B:
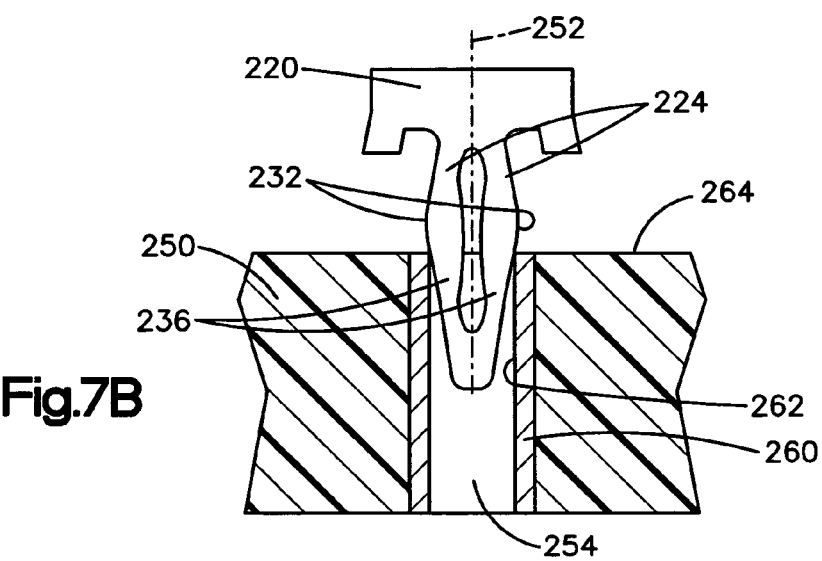
Figure 7C:
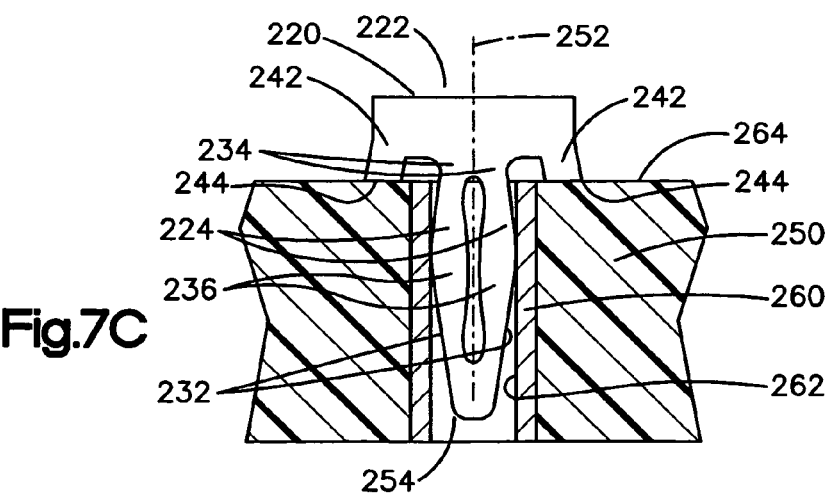

Advantageously, forming the connector portions 26 and 54 as compliant connectors allows the switch assembly 12 to be installed in a quick and reliable manner without the use of solder or other materials, such as adhesives or fasteners. This is shown in FIGS. 7A–7C. Referring to FIG. 7A, the compliant connector 220 is presented to a mounting body 250, such as a printed circuit board. The compliant connector 220 is directed along an axis 252 toward a hole 254 in the mounting body 250. As shown in FIGS. 7A–7C, the hole 254 has a side wall 260 that may be plated or otherwise coated to form an electrically conductive inner surface 262 of the hole.

Referring to FIG. 7B, as the compliant connector 220 moves along the axis 252, the second portions 236 of the retainer members 224 engage the mounting body 250. More specifically, the outer surface 232 of the second portions 236 engage the inner surface 262 of the hole 254 adjacent the intersection of the side wall 260 and an upper surface 264 of the mounting body. As shown in FIG. 7B, the compliant connector 220 form an interference with the hole 254. More specifically, the outer surface 232 of the retainer members 224 form an interference with the inner surface 262 of the side wall 260.

Referring to FIG. 7C, as the compliant connector 220 moves farther along the axis 252, the retainer members 224 are urged toward each other as a result of normal forces exacted on the second portions 236 by the hole 254. Also, as the compliant connector 220 moves farther along the axis 252, the outer surface 232 of the second portions 236 slide over the intersection of the inner surface 262 of the side wall 260 and the upper surface 264 of the mounting body 250. Once the intersections of the first and second portions 234 and 236 enter the hole 254, outer surface 232 of the retainer members 224 adjacent this intersection slide along the inner surface 262 of the side wall 260.

Due to the material construction of the compliant connector 220, the retainer members 224 have a spring bias that urge the retainer members away from each other. Thus, when the compliant connector 220 is inserted into the hole 254 and the retainer members 224 are urged toward each other, the retainer members are biased in an opposite direction into engagement with the side wall 260 of the hole 254. This causes a frictional engagement between the retainer members 224 and the side wall 260. Since the side wall 260 may be plated or otherwise coated with an electrically conductive material, this engagement may also result in an electrically conductive connection between the compliant connector 220 and the side wall.

Also, as the retainer members 224 are urged into the hole 254, the retainer members may undergo some deformation. Likewise, the plated side wall 260 may also be deformed as the retainer members 224 cut into or gouge the inner surface 262. This deformation may help promote or enhance the frictional engagement between the retainer members 224 and the side wall 260. The amount of frictional engagement between the retainer members 224 and the side wall 260 can be adjusted to desired levels by altering the material construction of the retainer members 224 and/or the side wall 60 and also by altering the amount of interference between the retainer members and the side wall.

As the compliant connector 220 is moved along the axis 252 into the installed condition of FIG. 7C, the lower end surfaces 244 of the arm portions 242 of the cross member 222 engage the upper surface 264 of the mounting body 250. This helps prevent over-insertion of the compliant connector 220 into the hole 254. This also helps ensure that the compliant connector 220 is in a desired position relative to the mounting body 250 when in the installed condition. The frictional engagement between the retainer members 224 and the side walls 260 help retain the compliant connector 220 in the installed condition.

Figure 8A:
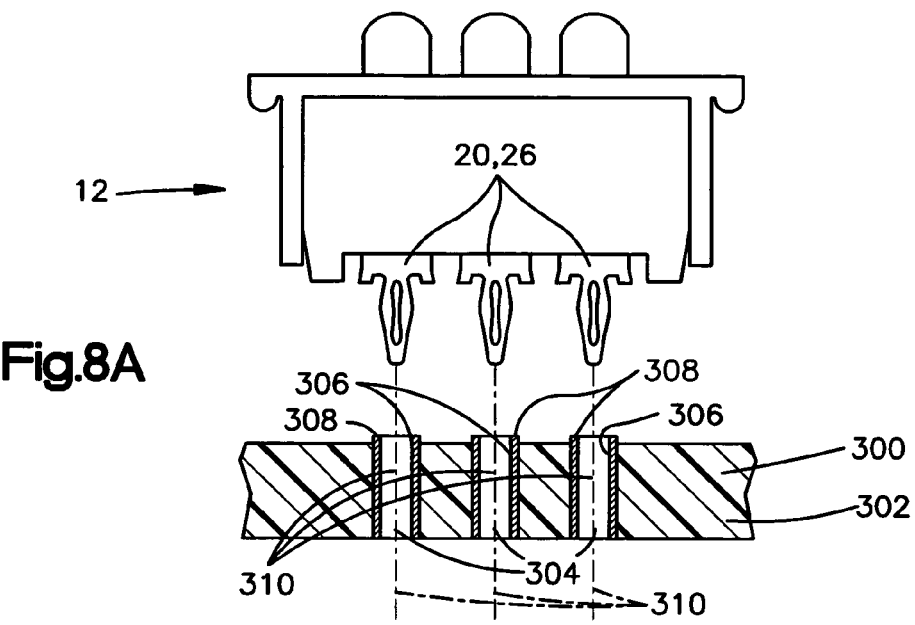
FIGS. 8A–8C are end elevation views illustrating the installation of the switch assembly of FIG. 1.
Figure 8B:
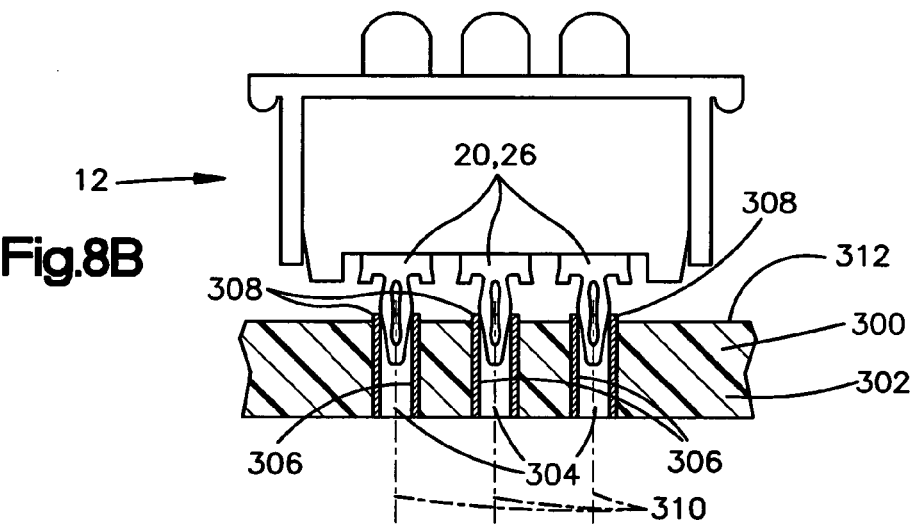
Figure 8C:
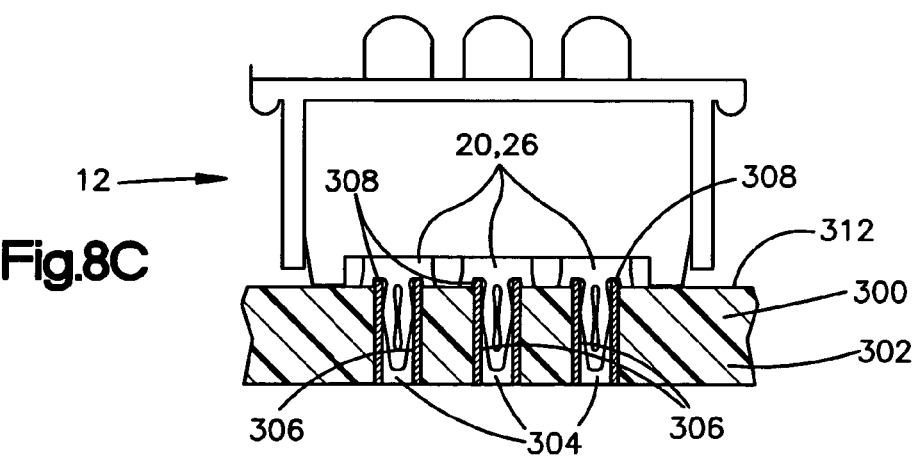

Installation of the switch assembly 12 on a mounting body 300 is illustrated in FIGS. 8A–8C. In the embodiment illustrated in FIGS. 8A–8C, the mounting body 300 is a printed circuit board 302. The printed circuit board 302 includes plated through holes 304 each having an electrically conductive side wall 306 that is electrically connected to conductive traces 308. FIGS. 8A–8C illustrate the installation of the first connectors 20 in the circuit board 302. It will be appreciated, however, that the installation of the second connectors 40 would be performed in an identical manner.

Referring to FIG. 8A, the connector portions 26 of the first connectors 20 are presented to the holes 304 of the circuit board 302. The switch assembly 12 is moved toward the circuit board 302 such that the connector portions 26 move along respective axes 310 toward the holes 304.

Referring to FIG. 8B, as the switch assembly 12 moves toward the circuit board 302 and the connector portions 26 move along the respective axes 310, the connector portions 26 engage the side walls 306 of their respective holes 304. As described above in reference to FIGS. 7A–7C, retainer members of the connector portions 26 engage the circuit board 302 at the intersection of the side walls 306 and an upper surface 312 of the circuit board.

Referring to FIG. 8C, as the connector portions 26 move into the holes 304, the spring bias of the connector portions and/or material deformation of the connector portions and side walls 306 creates a frictional engagement between the side walls and the connector portions. This engagement creates an electrical connection between the first contact 20 and the side wall 306 and, thus, the traces 308 on the circuit board 302 that are electrically connected to the side wall.

When the switch assembly 12 is installed on the circuit board 302, the first contacts 20 engage the upper surface 312 of the circuit board. As described above in reference to FIGS. 7A–7C, arm portions 242 of the connector portions 26 engage the upper surface 312 of the circuit board 302. This helps prevent over-insertion of the connector portions 26 into the holes 304. This also helps ensure that the first contacts 20 and, thus, the switch assembly 12, is in a desired position relative to the circuit board 302 when in the installed condition of FIG. 8C.

The arm portions 242 of the connector portions 26 of the first and second contacts 20 and 40, engaging the upper surface 312 of the circuit board 302, reduce the stack-up tolerance of the switch assembly essentially to two tolerances. One tolerance is associated with the first contact 20 and the second tolerance is associated with the second contact 40. More specifically, the tolerance of the first contact 20 is associated with the dimension measured from the upper surface of the circuit board 302 to the upper surface of the pad portion 22. The tolerance of the second contact 40 is associated with the dimension measured from the lower surface of the pad portion 42 to the apex of the actuator portion 44. The two-piece contact construction of the switch assembly 12 and the incorporation of the compliant connector portions 26 help minimize tolerance stack-up associated with solder mounting, housing dimensions, and additional switch components.

Figure 9:
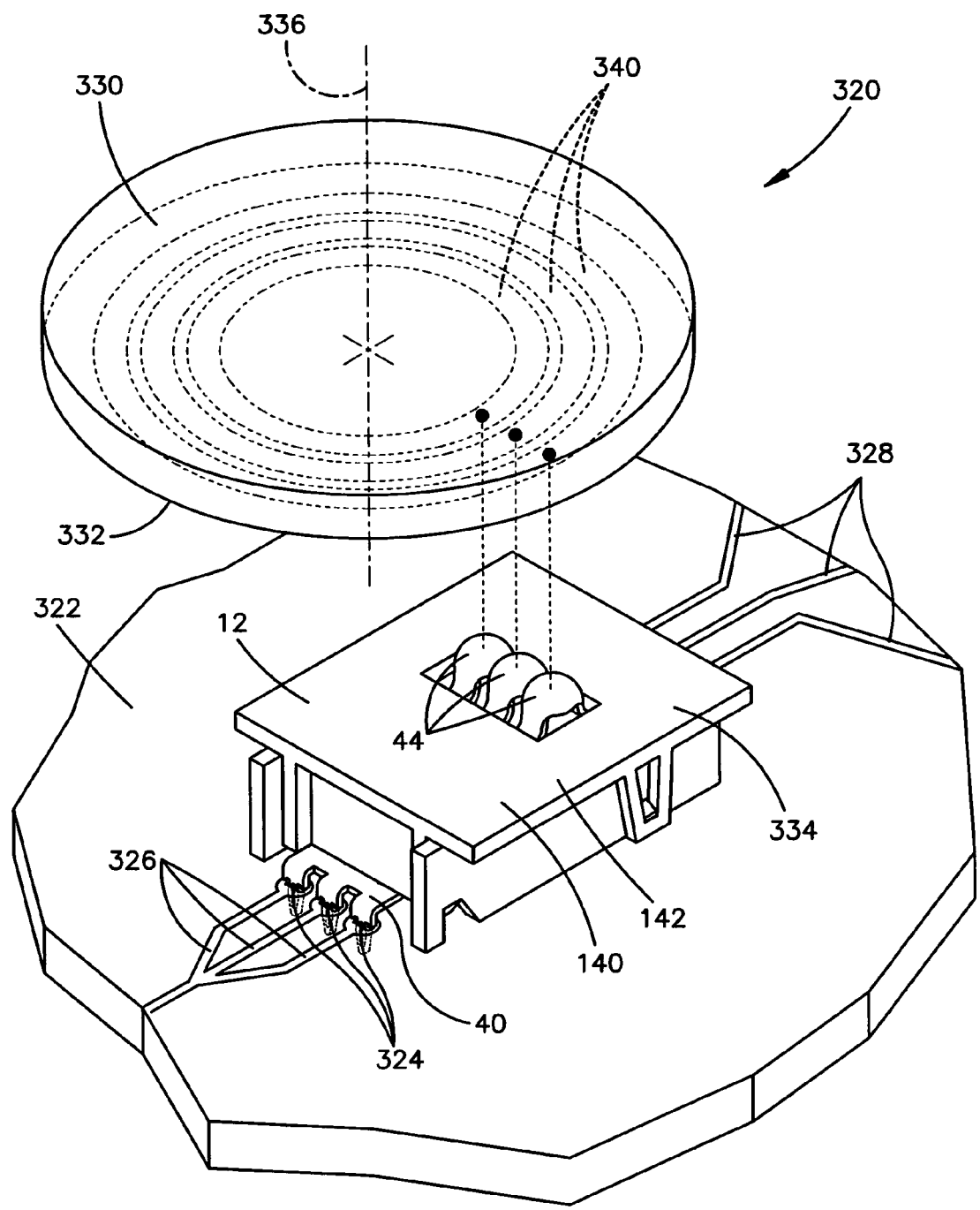
FIG. 9 is a partially exploded perspective view illustrating an embodiment of the present invention wherein the switch assembly of FIG. 1 is implemented in a rotary selector switch configuration.

Referring to FIG. 9, the apparatus 10 may comprise a rotary selector switch 320. In this configuration, the switch assembly 12 is included as a part of a rotary selector switch 320. The rotary selector switch 320 also includes a circuit board 322 upon which the switch assembly 12 is mounted and a rotary actuator 330. As viewed in FIG. 9, the second contacts 40 of the switch assembly 12 are mounted in plated through holes 324 of the circuit board 322. The second contact 40 is thus electrically connected to conductive traces 326 of the circuit board 322. The first contacts (not shown in FIG. 9) are mounted in plated through holes electrically connected to conductive traces 328 of the circuit board 322.

The rotary actuator 330 has a generally flat cylindrical or disk shaped configuration with a lower surface 332 presented generally toward and an upper surface 334 of the switch assembly formed by the top wall 142 of the cover 140. More specifically, the lower surface 332 is presented toward the actuator portions 44 of the second contact 40, which project from the upper surface 334. The rotary actuator 330 is rotatable, manually or otherwise, relative to the switch assembly about an axis 336.

The rotary actuator 330 includes three concentric ring shaped actuator members 340 that are centered about the axis 336 and that project from the lower surface 332 of the rotary actuator. As indicated by the dotted lines in FIG. 9, each of the actuator members 340 corresponds to one of the actuator portions 44. In the exploded view of FIG. 9, the rotary actuator 330 is spaced from the upper surface 334 and the actuator portions 44. However, when the rotary selector switch 320 is in an assembled condition, the lower surface 332 and, more importantly, the actuator members 340 are positioned in close proximity with the actuator portions 44.

The assembled condition of the rotary selector switch 320 is illustrated in FIGS. 10A–10C.

The actuator member 340 illustrated in FIGS. 10A–10C includes a non-actuating portion 342 and an actuating portion 344. Each non-actuating portion 342 and actuating portion 344 occupy an angular segment or portion of their respective actuator member 340. Each actuator member 340 of the rotary actuator 330 may have any desired number of non-actuating portions 342 and/or actuating portions 344 in any desired position and occupying any desired angular portion of the actuator member. The non-actuating portions 342 have a lower surface 350 spaced vertically above an apex 352 of the actuator portion 44 of the second contact 40, as viewed in FIGS. 10A–10C. The actuating portions 344 have a lower surface 354 spaced vertically below the apex 352 of the actuator portion 44 as viewed in FIGS. 10A–10C. The actuating portions 344 also include an angled surface 356 that forms a transition between the non-actuating portions 342 and the actuating portion 344 and vice versa.

When the rotary actuator 330 is rotated about the axis 336 (see FIG. 9), the actuator members 340 move relative to the switch assembly 12 and, more specifically, the actuator portions 44. This movement of the actuator members 340 is indicated generally by the arrows labeled 360 (clockwise) and 362 (counterclockwise) in FIGS. 10A–10C.

Referring to FIG. 10A, the rotary selector switch 320 is illustrated in a condition wherein the first and second contacts 20 and 40 are in the non-actuated condition. Since, in the embodiment illustrated in FIGS. 10A–10C, the first and second contacts 20 and 40 are normally closed contacts, the first and second pad portions 22 and 42 are engaged with each other in the non-actuated condition of FIG. 10A. Thus, when any of the pairs of first and second contacts 20 and 40 are in the non-actuated condition illustrated in FIG. 10A, electrical conductivity is established between the traces 326 and 328 (see FIG. 9) associated with that particular pair of contacts.

Movement of the rotary actuator 330 in the counterclockwise direction is illustrated in FIGS. 10B and 10C. As the actuator member 340 moves in the counterclockwise direction, the angled surface 356 moves toward the cam surface 370 of the actuator portion 44. Referring to FIG. 10B, as the actuator member 340 continues to move in the counterclockwise direction, the angled surface 356 engages the cam surface 370. This creates a normal force between the angled surface 356 and the cam surface 370, which urges the actuator portion 44 in a downward direction indicated by the arrow labeled 372 in FIGS. 10B and 10C.

Referring to FIG. 10C, as the actuator member 340 continues to move in the counterclockwise direction, the angled surface 356 slides over the cam surface 370 and urges the actuator portion 44 to move in the downward direction. The angled surface 356 creates a normal force against the cam surface 370, which creates resultant forces acting on the second contact 40 in a vertical (actuating) direction and a horizontal (wiping) direction. As a result, the spring portion 46 deflects against its spring bias, and thus bends or pivots about the top surface 206 of the end wall 106. This causes the first and second contacts 20 and 40 to move away from each other into the actuated condition illustrated in FIG. 10C. Since, in the embodiment of FIGS. 10A–10C, the first and second contacts 20 and 40 are normally closed, when any of the pairs of first and second contacts 20 and 40 are in the actuated condition illustrated in FIG. 10C, electrical conductivity between the traces 326 and 328 (see FIG. 9) associated with that particular pair of contacts is broken.

The material construction of the contacts 14 helps ensure a long duty life of the switch assembly 12. This construction helps minimize the amount of plastic deformation experienced by the contacts 14 as a result of deflection during normal usage. In fact, the contacts 14 may even experience little or no plastic deformation if deflected beyond their normal usage deflection. The self-contained contacting force of the switch assembly 12 may thus be retained throughout its extended duty life.

Referring to FIGS. 10A–10C, the first and second contacts 20 and 40 are arranged to provide a wiping action between their respective pad portions 22 and 42. Referring to FIG. 10C, the pad portion 42 of the second contact 40 has a normal position relative to the actuator portion 44. This position is illustrated in solid lines at 42 in FIG. 10C. When the contacts 20 and 40 are in the non-actuated condition of FIGS. 10A and 10B, the spring bias of the spring portion 46 urges the pad portion 42 against the pad portion 22, which causes the pad portion 42 to deflect to the position illustrated in FIGS. 10A and 10B. This position is also illustrated in dashed lines at 42' in FIG. 10C. As the first and second contacts 20 and 40 move from the non actuated condition to the actuated condition and vice versa, their respective pad portions 22 and 42 rub against each other as the pad portion 42 deflects and returns to its normal position. This provides a wiping action between the pad portions 22 and 42. This wiping action is also produced as a result of the horizontal resultant force component of the normal force applied to the cam surface 370 by the angled surface 356 of the actuating member 340.

The rotary selector switch 320 illustrated in FIGS. 9–10C includes three contact pairs 14. For any given rotary position of the rotary actuator 330, these three contact pairs 14 can be placed in either the actuated or non-actuated condition. The actuation or non-actuation of each contact pair 14 for any given rotary position of the actuator 330 is predetermined by the configuration of the actuating members 340. If a contact pair 14 is to be placed in the actuated condition when the rotary actuator 330 is at a given rotary position, the actuating member 340 is configured to have an actuating portion 344 at that given rotary position. If a contact pair 14 is to be placed in the non-actuated condition when the rotary actuator 330 is at a given rotary position, the actuating member 340 is configured to have an non-actuating portion 342 at that given rotary position.

It will thus be appreciated that, for any given rotary position of the rotary actuator 330, the rotary selector switch 320 may be adapted to place the three contact pairs 14 in the actuated or non-actuated condition in any desired combination. It will also be appreciated that the electrical signals provided by the three contact pairs 14 may be multiplexed or encoded to provide a three bit binary code that corresponds to the condition (actuated/non-actuated) of the contact pairs 14. Those skilled in the art will recognize that such a three bit binary code provides eight unique codes. The rotary selector switch 320 may thus be adapted to provide any one of these eight unique three bit binary codes for any predetermined rotary position of the rotary selector 330. Alternatively, the switch assembly 12 could be configured to provide three discrete signals, one associated with each of the contact pairs 14.

Figure 11:
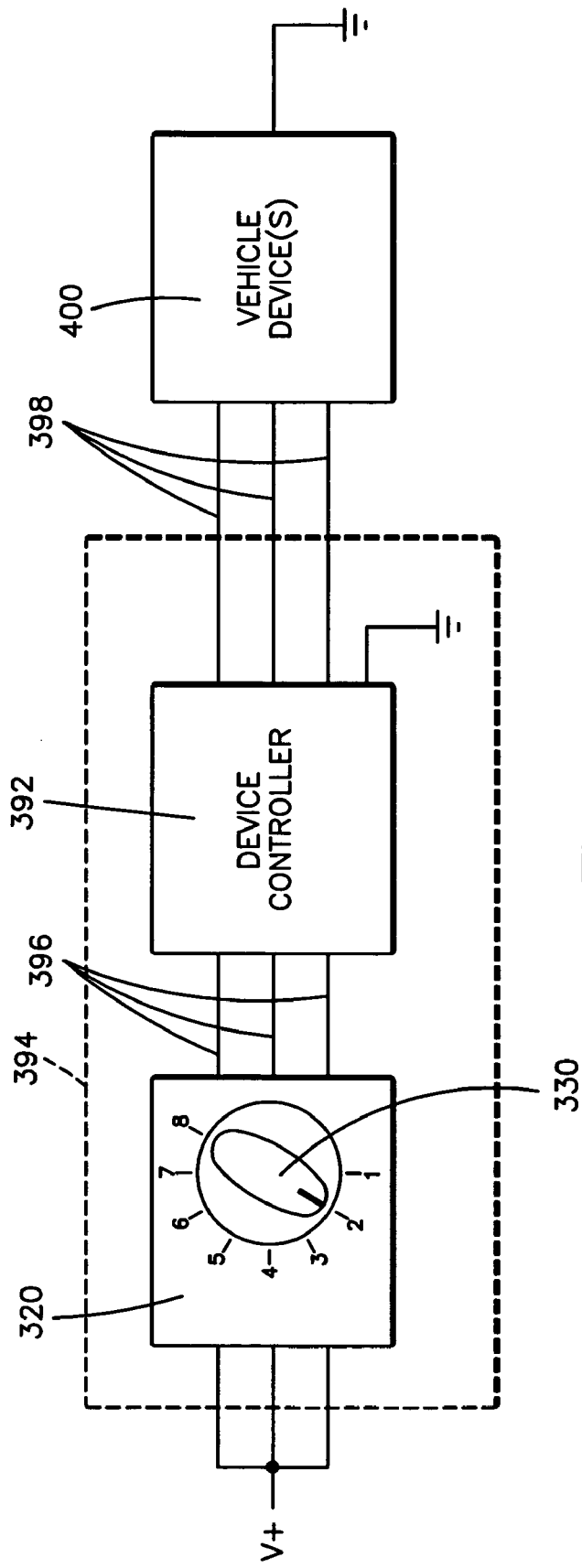
FIG. 11 is a schematic illustration of an exemplary implementation the rotary selector switch configuration of FIG. 9.

Referring to FIG. 11, the switch assembly 12 of the present invention, incorporated in a rotary selector switch 320 as illustrated in FIGS. 9–10C, is shown in an implementation wherein the rotary selector switch is used to control vehicle device(s) 390. Such vehicle devices may include vehicle lighting systems, climate control systems, windshield wipers, etc., each of which may have a plurality of modes of operation. In this implementation, the rotary selector switch 320 would thus be used to select one of a variety of modes of operation for the vehicle device 390.

In the embodiment illustrated in FIG. 11, the rotary selector switch 320 is operatively connected to positive vehicle battery voltage, indicated at $V^+$. The rotary selector switch 320 is also operatively connected to a device controller 392 to provide three signals, indicated at 396, to the controller. Each of the signals 396 is associated with a corresponding one of the contact pairs of the rotary selector switch 320. The controller 392 is operatively connected to the vehicle device(s) 390 by means such as wires or a cable.

The rotary selector switch 320 and the controller 392 may be assembled as a unit to form a module, indicated generally at 394, for controlling the vehicle device 390, or they may be separately installed components. In this modular assembly, the rotary selector switch 320 and the controller 392 may be mounted to a common circuit board and enclosed on a housing (not shown). This unit may then be installed in a vehicle at a desired location, such as on an instrument panel of the vehicle (not shown).

In the implementation shown in FIG. 11, the rotary selector switch 320 has eight positions. Each of these eight positions may be associated with any one of the eight unique three bit binary codes discussed above. The rotary selector switch 320 thus supplies the signals 396 in the form of voltage $V^+$ to the controller 392 in accordance with the three bit binary code associated with the rotary position of the rotary actuator 330. The controller 392 is programmed or otherwise arranged to provide electrical current to the vehicle device(s) 390, based on the combination of signals 396 received from the rotary selector switch 320, to place the device(s) in the desired mode of operation.

In the arrangement illustrated in FIG. 11, the switch assembly 12 of the rotary selector switch 320 supplies the signals 396 as low current control signals to the controller 392. The controller 392, in turn, provides high current drive signals 398 to the vehicle devices 390. The controller 392 may determine when and which drive signals 398 to provide in any known manner. For example, the controller 392 may include computer means for executing control logic based on the signals 396 to determine when to provide the drive signals 398. The controller 392 could alternatively comprise electromechanical devices, such as relays, for supplying the drive signals 398 when energized by the control signals 396. As a further alternative, the controller 392 could be eliminated, in which case the rotary selector switch 320 could be connected directly to the vehicle devices 390 and provide drive signals directly to the vehicle devices.

In the first embodiment, the switch assembly 12 is illustrated in an implementation wherein the switch is included in a rotary selector switch assembly 320 in which the contacts 14 are actuated by a rotary actuator 330. Those skilled in the art, however, will appreciate that the switch assembly 12 could have an implementation wherein the contacts 14 are actuated by a linear actuator, i.e., an actuator that moves in a linear direction. Also, since the actuator portion 44 has a domed configuration, such a linear actuator, moving generally parallel with the top wall 142 of the cover 140, could strike the actuator portion at any desired angle and actuate the switch assembly 12. Such a linearly actuated switch assembly could be desirable in automotive implementations such as window switches, light switches, climate control switches, ignition switches, and brake switches.

Figure 12A:
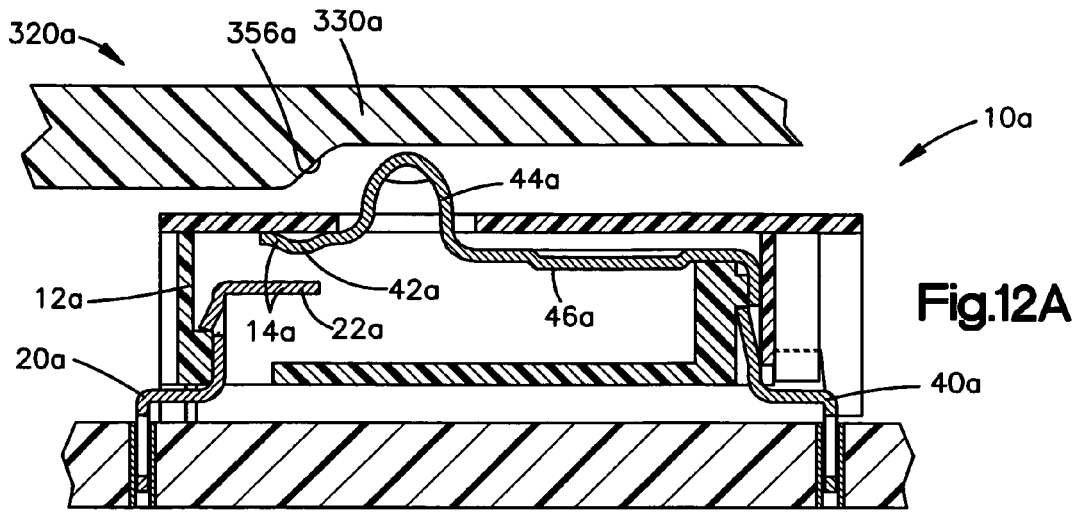
FIGS. 12A–12C are sectional views illustrating the operation of a rotary selector switch configuration incorporating a switch assembly according to a second embodiment of the invention.
Figure 12B:
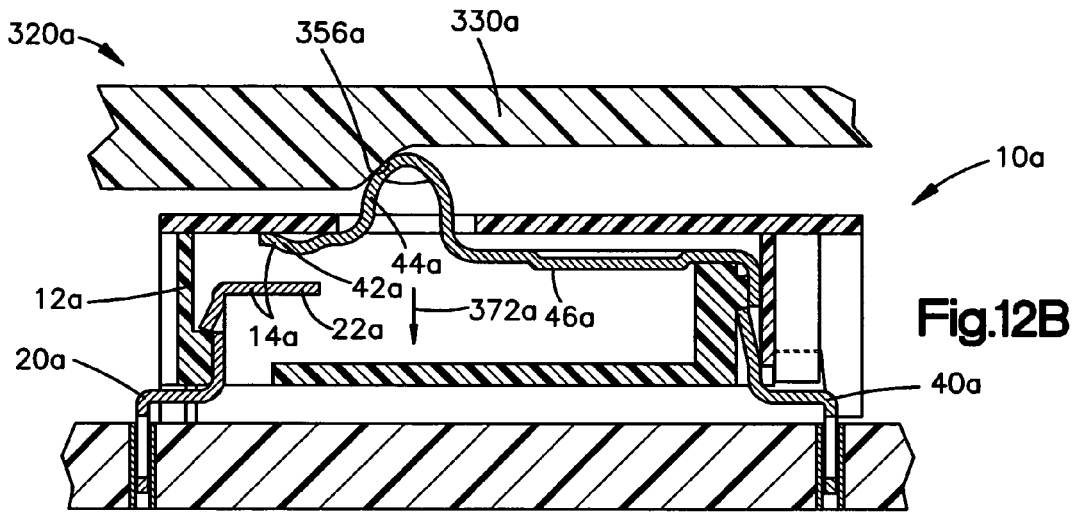
Figure 12C:
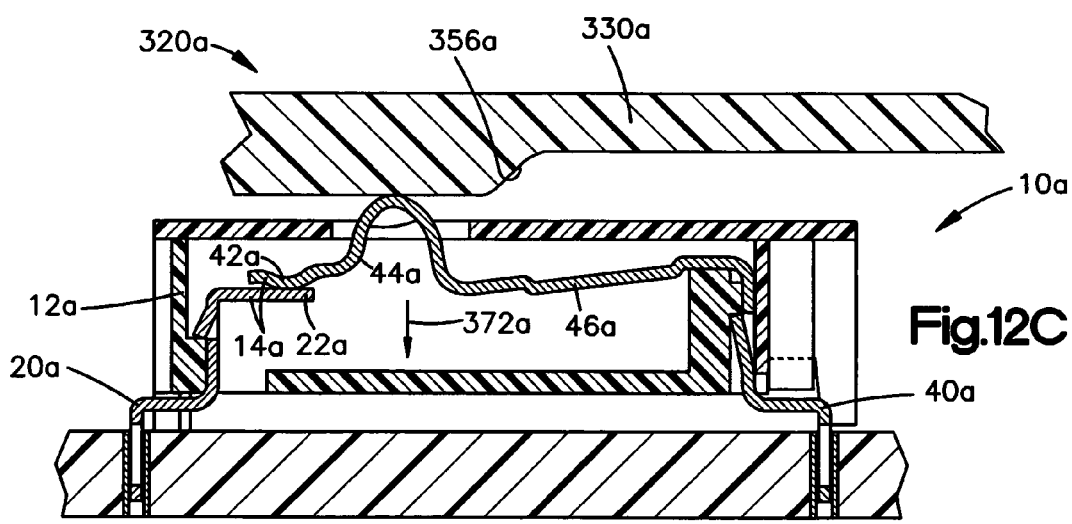

A second embodiment of the present invention is illustrated in FIGS. 12A–12C. The apparatus 10a of the second embodiment of the invention is similar to the apparatus 10 first embodiment of the invention illustrated in FIGS. 1–11. Accordingly, numerals similar to those of FIGS. 1–11 will be utilized in FIGS. 12A–12C to identify similar components, the suffix letter "a" being associated with the numerals of FIGS. 12A–12C to avoid confusion. The rotary selector switch 320a (FIGS. 12A–12C) of the second embodiment is identical to the rotary selector switch 320 (FIGS. 1–11), except that the contact pairs 14a (FIGS. 12A–12C) are normally opened contacts.

Referring to FIGS. 12A and 12B, when the normally opened contact pairs 14a of the switch assembly 12a are in the non-actuated condition, the pad portions 22a and 42a of the first and second contacts 20a and 40a are spaced from each other. Thus, in the non-actuated condition, there is no electrical conductivity between the first and second contacts 20a and 40a. As the rotary actuator 330a is rotated and the angled surface 356a moves into engagement with the actuator portion 44a, the pad portion 42a is urged in the downward direction 372a. The spring portion 46a deflects and the pad portion 44a moves in the downward direction 372a to the actuated condition illustrated in FIG. 12C and into engagement with the pad portion 22a. In the actuated condition, electrical conductivity is established between the first and second contacts 20a and 40a.

Figure 14:
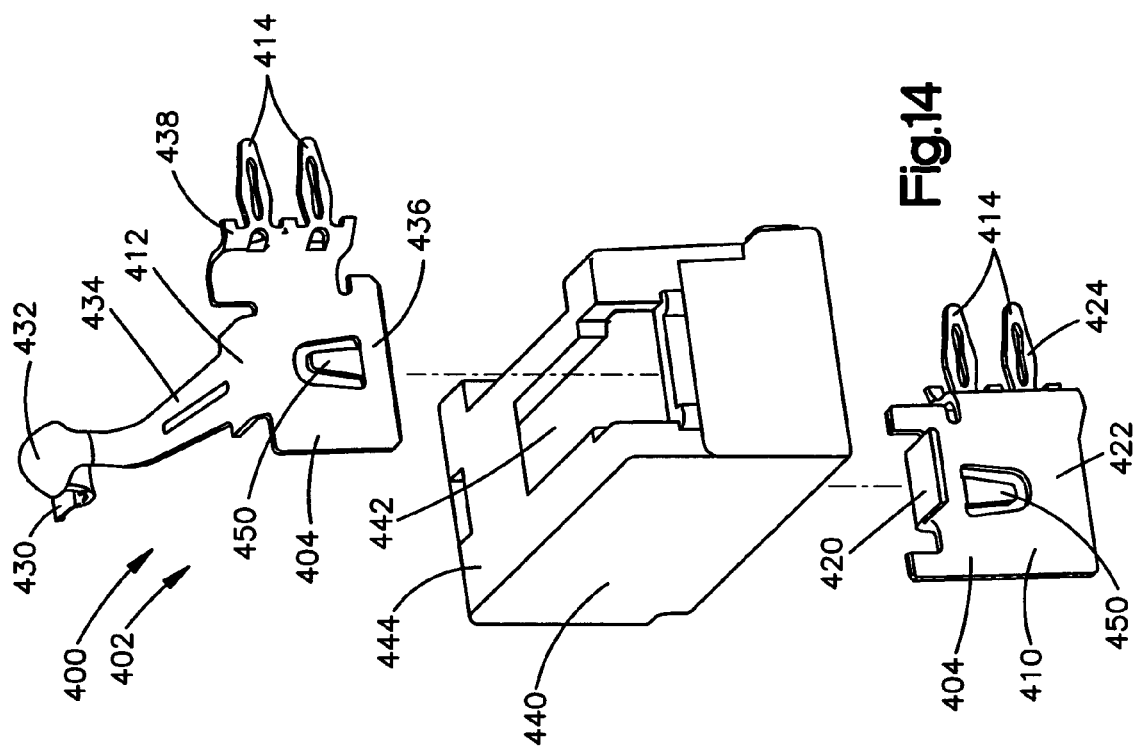
FIG. 14 is an exploded perspective view of the switch assembly of FIG. 13.
Figure 13:
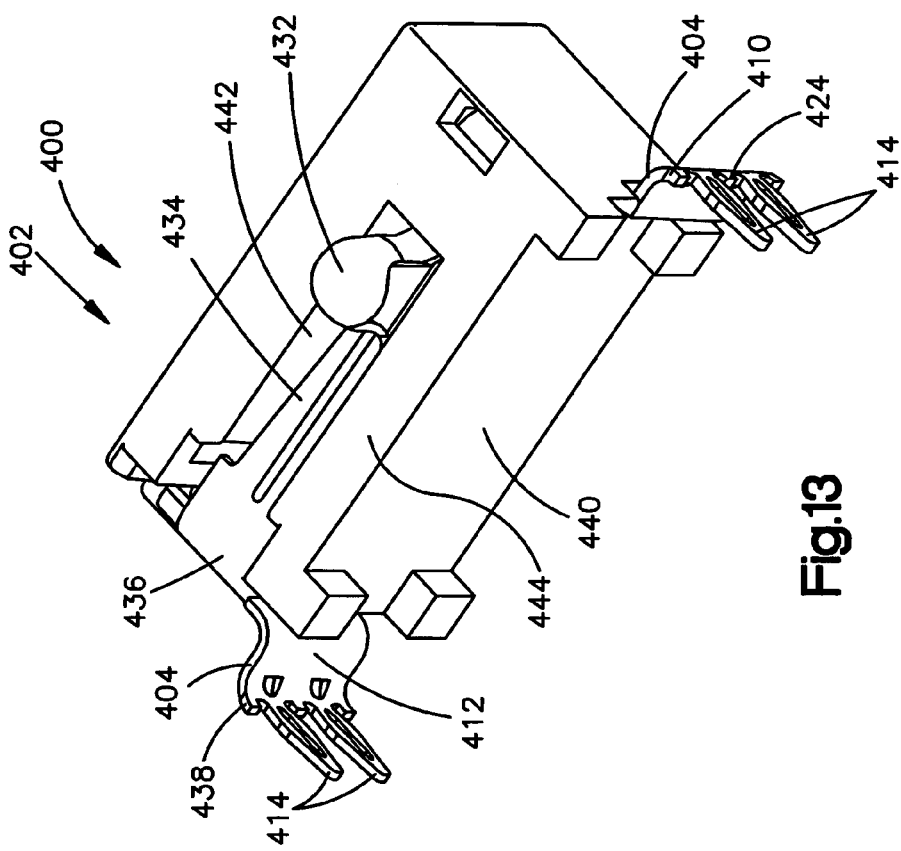
FIG. 13 is a perspective view of a switch assembly according to a third embodiment of the invention.

An apparatus 400 according to a third embodiment of the present invention is illustrated in FIGS. 13 and 14. The apparatus 400 of the third embodiment is a side actuated version of the switch assembly of the first and second embodiments illustrated in FIGS. 1–12C. The side actuated switch assembly 402 is illustrated in FIGS. 13 and 14 is shown as including a single set of contacts 404. The switch assembly 402 could, however, include multiple sets of contacts as illustrated in the first and second embodiments of the invention (see FIGS. 1–12C). The contacts 404 may be normally opened or normally closed contacts.

Referring to FIGS. 13 and 14, the contacts 404 include a first contact 410 and a second contact 412. The first and second contacts 410 and 412 each are formed as a single piece of electrically conductive material in the manner described above in regard to the first and second embodiments.

Referring to FIG. 14, the first contact 410 includes a pad portion 420, a support portion 422, and a connector portion 424, all of which are similar to the portions of the first contact of the first and second embodiments of FIGS. 1–12C. The main difference between the first contact 410 of the third embodiment and the first contact of the first and second embodiments is that the pad portion 420 of the first contact 410 (FIG. 14) extends transversely from a side or lateral edge of the support portion 422.

The second contact 412 includes a pad portion 430, an actuator portion 432, a spring portion 434, a support portion 436, and a connector portion 438, all of which are similar to the portions of the second contact of the first and second embodiments of FIGS. 1–12C. The main difference between the second contact 412 of the third embodiment and the second contact of the first and second embodiments is that the pad portion 430 of the second contact 412 (FIG. 14) extends transversely from a side or lateral edge of the support portion 436.

The connector portions 424 and 438 each include compliant connector pins 414. The compliant connector pins 414 are formed identical to and function in the same manner as the connector pins of the first and second embodiments.

In the embodiment illustrated in FIGS. 13 and 14, a housing 440 of the side actuated switch assembly 402 supports the first and second contacts 410 and 412 in an assembled condition of the switch assembly 402. The assembled condition of the switch assembly 402 is illustrated in FIG. 13. The housing 440 is constructed in a manner similar or identical to the housing of the first and second embodiments of FIGS. 1–12C. The main difference between the housing 440 of the third embodiment (FIGS. 13 and 14) and the housing of the first and second embodiments (FIGS. 1–12C) is that the rectangular opening 442 (FIGS. 13 and 14) through which the actuator portion 432 extends is located on a side wall 444 of the housing.

The housing 440 and the first and second contacts 410 and 412 are assembled in a manner indicated generally by the dashed lines in FIG. 14 to form the assembled switch assembly 402 illustrated in FIG. 13. The first and second contacts 410 and 412 are inserted into the housing 440 until their respective latch portions 450 "snap" into place.

The side actuated switch assembly 402 of the third embodiment allows for actuation of the contacts 404 by an actuating member (not shown) positioned adjacent the side wall 444 of the housing 440. Such an actuator may be a linear actuator or a rotary actuator, as described above in regard to the first and second embodiments.

In the embodiments of the invention described above, the switch assembly includes contact pairs in which the pad portions are adapted for low current uses. Such low current contact pairs may, for example, be reserved for applications in which the switch assembly is used to switch currents of less than one ampere, e.g., 500 milliamperes (mA). As stated above, the pad portions of these low current contact pairs may be plated with a precious metal, such as gold or silver, in order to improve their electrical conductivity.

Figure 15:
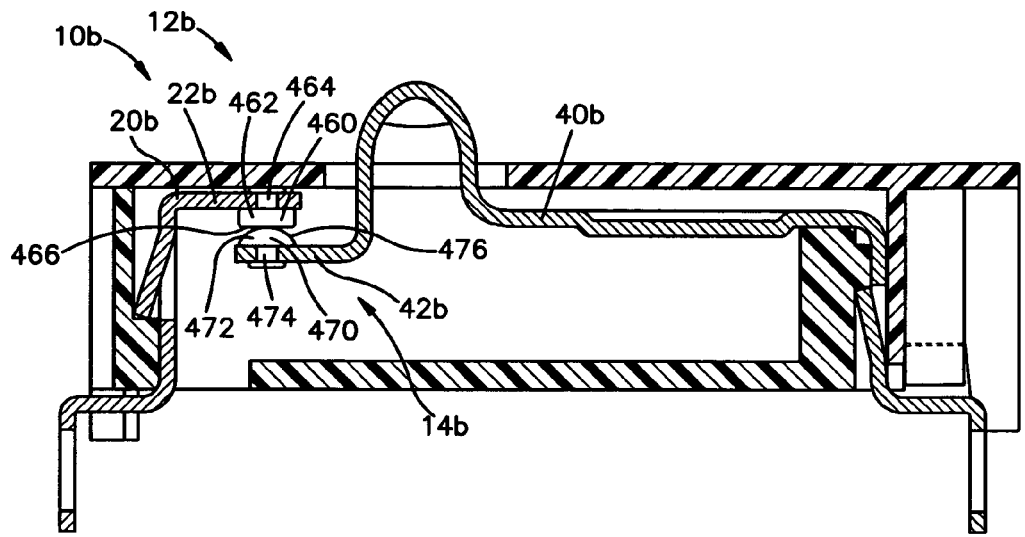
FIG. 15 is a sectional view of a switch assembly according to a fourth embodiment of the invention.

A fourth embodiment of the present invention is illustrated in FIG. 15. The apparatus 10b of the fourth embodiment of the invention is similar to the apparatus 10 of the first embodiment of the invention illustrated in FIGS. 1–11. Accordingly, numerals similar to those of FIGS. 1–11 will be utilized in FIG. 15 to identify similar components, the suffix letter "b" being associated with the numerals of FIG. 15 to avoid confusion. The switch assembly 12b (FIG. 15) of the fourth embodiment is identical to the switch assembly 12. (FIGS. 1–11), except that the contact pairs 14b (FIGS. 12A–12C) are high current contacts.

Referring to FIG. 15, the contact sets 14b of the switch assembly 12b are fit with contact pads that are adapted to switch high current electricity. By "high current" it is meant to refer to refer to electrical current in the range of about 1–30 amperes. For example, in an automotive application, the switch assembly 12b may be used to switch electrical currents of up to 14 amperes or more.

As shown in FIG. 15, the pad portion 22b of the first contact 20b is fit with a first contact pad 460. The pad portion 42b of the second contact 40b is fit with a second contact pad 470. The first and second contact pads 460 and 470 help provide the high current switching capacity of the switch assembly 12b. The first contact pad 460 includes a pad portion 462 and a stem portion 464. The second contact pad 470 includes a pad portion 472 and a stem portion 474.

The first and second contact pads 460 and 470 may be fastened to the pad portions 22b and 42b, respectively, by known means, such as stamping, staking, press-fitting riveting, soldering, or welding. As shown in FIG. 15, the first and second contact pads 460 and 470 are fixed to the pad portions 22b and 42b by staking the contact pads to their respective pad portions. The contact pads 460 and 470 are staked to their respective pad portions 22b and 42b by passing their respective stem portions 464 and 474 through apertures in the pad portions and deforming the stem portions to perfect the connection. This may be achieved, for example, by stamping the contacts 20b and 40b to their illustrated form while simultaneously staking the contact pads 460 and 470 in an appropriately configured die (not shown).

The contact pads 460 and 470 may be constructed of metals or metal alloys, such as precious metals or precious metal alloys, in order to help provide the arc suppression qualities required for high current switching. For example, in the embodiment illustrated in FIG. 15, the first contact pad 460 may be a cathode pad formed, for example, of a silver-nickel alloy. The second contact pad 470 may be an anode pad formed, for example, of a silver-tin oxide. It will be appreciated that alternative metals or metal alloys may be used to construct the first and second contact pads 460 and 470. The silver-tin oxide is a relatively hard metal and thus helps improve the service life of the first and second contact pads 460 and 470 and helps prevent the contact pads from welding when switching high electrical currents. The contact pads 460 and 470 will also resist welding because they are constructed of different metals and because the metals have relatively high melting points.

The pad portion 462 of the first contact pad 460 has a generally cylindrical configuration with a generally flat contact surface 466. The pad portion 472 of the second contact pad 470 has a generally spherical or domed configuration with a generally domed contact surface 476. In the condition of the switch assembly 12*b* illustrated in FIG. 15, the contact surfaces 466 and 476 engage each other to form an electrically conductive contact between the first and second contacts 20*b* and 40*b*. Because there is some inherent flexure in the contacts 20*b* and 40*b* during actuation, the domed contact surface 476 of the second contact pad 470 may move laterally against the flat contact surface 466 of the first contact pad 460 and thus provide a wiping action for cleaning the engaging contact surfaces.

Although the high current switch assembly 12*b* of the fourth embodiment is illustrated as having a configuration similar to the configuration of the switch assembly of the first embodiment (FIGS. 1–11), it will be appreciated that the high current contact pads 460 and 470 of the fourth embodiment (FIG. 15) may be implemented in the switch assembly configurations of the first, second, or third embodiments. The high current contact pads 460 and 470 may thus be implemented in a normally closed switch assembly, a normally opened switch assembly similar to that illustrated in FIGS. 12A–12C, or a side actuated switch assembly similar to that illustrated in FIGS. 13 and 14. It will also be appreciated that, although the high current switch assembly 12*b* of FIG. 15 is capable of switching high current electrical signals, it could also switch low current (less than one ampere) electrical signals.

The switch assembly 12*b* of the fourth embodiment, being adapted for high current applications, may be especially well suited for discrete actuation of electrical devices. For example, in an automotive application, the contact pairs 14*b* of the switch assembly 12*b* may be used to switch electrical current directly to vehicle devices that draw relatively high currents, such as head lamps and heater/air conditioning blowers. This may eliminate the need for interposing devices, such as relays or controllers, for switching electrical current to the vehicle devices. Thus, for example, the high current switch assembly 12*b* may be incorporated in the selector switch 320 of FIGS. 11–12C and thereby eliminate the need for the controller 402, in which case the vehicle device(s) 400 may be controlled directly via the switch 320.

Figure 17:
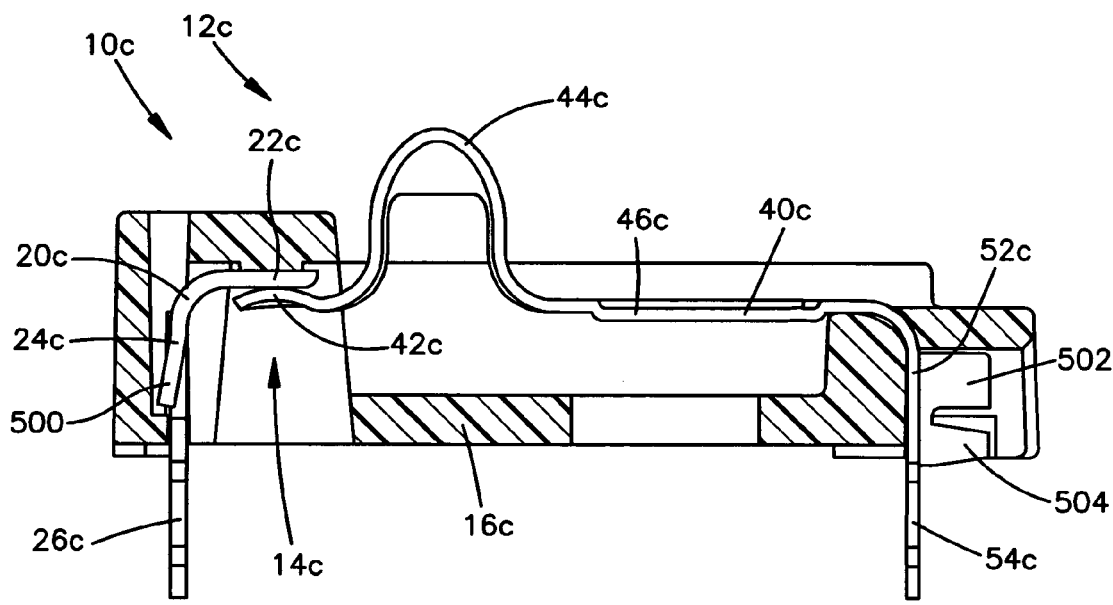
FIG. 17 is a sectional view of the switch assembly of FIG. 16.
Figure 16:
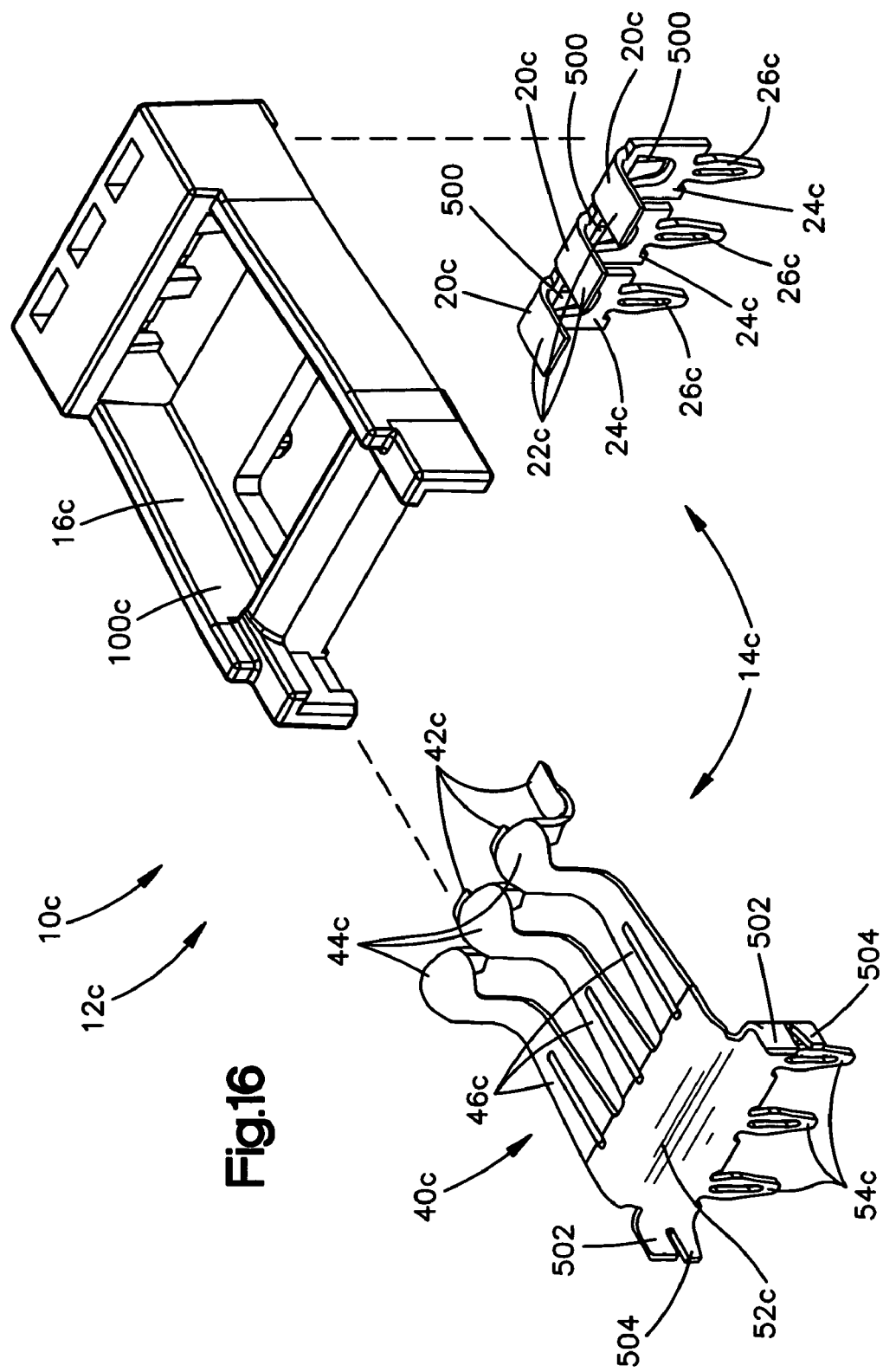
FIG. 16 is a perspective view of a switch assembly according to a fifth embodiment of the present invention.

A fifth embodiment of the present invention is illustrated in FIGS. 16 and 17. The apparatus 10*c* of the fifth embodiment of the invention is similar to the apparatus 10 of the first embodiment of the invention illustrated in FIGS. 1–11. Accordingly, numerals similar to those of FIGS. 1–11 will be utilized in FIGS. 16 and 17 to identify similar components, the suffix letter "c" being associated with the numerals of FIGS. 16 and 17 to avoid confusion.

Referring to FIGS. 16 and 17, the contact sets 14*c* of the switch assembly 12*c* are similar to those of the first embodiment. The first contacts 20*c* include pad portions 22*c*, support portions 24*c* and connector portions 26*c* that are similar to the corresponding portions of the first contacts of the first embodiment. The second contacts 40*c* include pad portions 42*c*, actuator portions 44*c*, spring portions 46*c*, support portions 52*c*, and connector portions 54*c* similar to the corresponding portions of the second contacts of the first embodiment. The connector portions 26*c* and 54*c* of the first and second contacts 20*c* and 40*c* comprise compliant connectors similar or identical to those illustrated in the first embodiment. The switch assembly 12*c* of the fifth embodiment may be implemented in a normally closed switch assembly (shown) or a normally opened switch assembly similar to that illustrated in FIGS. 12A–12C.

According to the fifth embodiment, the housing 16*c* is constructed as a single piece of material, eliminating the cover, and leaving a base portion 100*c*. The housing 16*c*, i.e., the base portion 100*c*, supports the first and second contacts 20*c* and 40*c*. As shown in FIG. 17, the housing 16*c* may leave the actuator portions 44*c* and spring portions 46*c* of the second contacts 40*c* exposed. The first contacts 20*c* include deflectable tabs 500 that cooperate with the housing 16*c* to help connect the first contacts with the housing. The second contacts 40*c* include flange portions 502 that include deflectable tabs 504 that cooperate with the housing 16*c* to help connect the second contacts with the housing.

Figure 19:
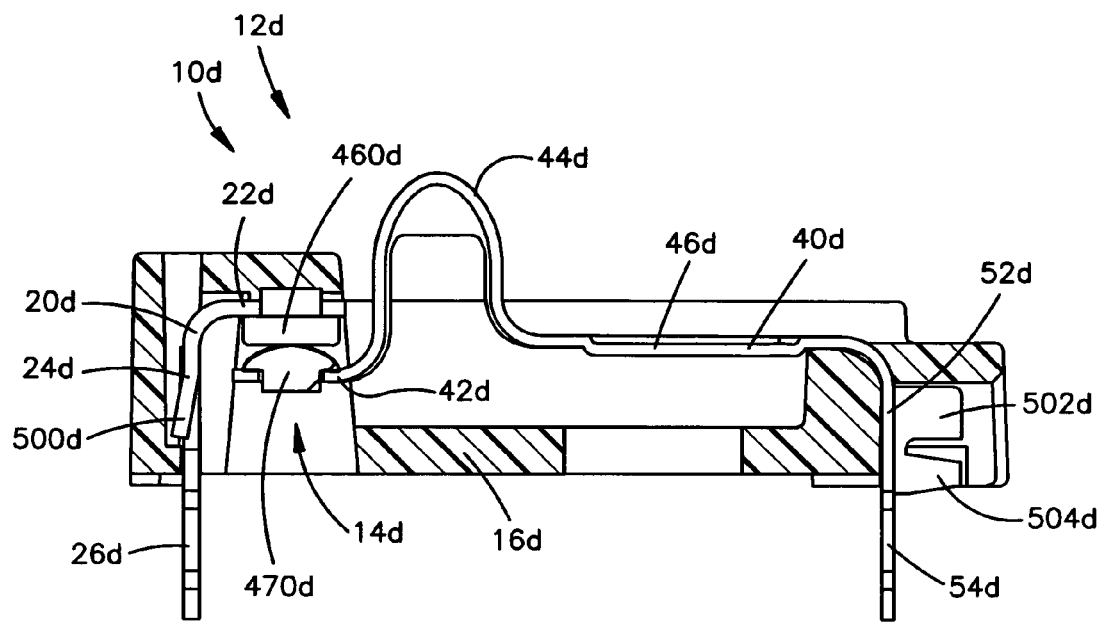
FIG. 19 is a sectional view of the switch assembly of FIG. 18.

A sixth embodiment of the present invention is illustrated in FIGS. 18 and 19. The apparatus 10*d* of the sixth embodiment of the invention is similar to the apparatus 10*b* of the fourth embodiment (FIG. 15) and similar to the apparatus 10*c* of the fifth embodiment (FIGS. 16 and 17). Accordingly, numerals similar to those of FIGS. 15–17 will be utilized in FIGS. 18 and 19 to identify similar components, the suffix letter "d" being associated with the numerals of FIGS. 18 and 19 to avoid confusion.

Referring to FIGS. 17 and 18, basically, the apparatus 10*d* of the sixth embodiment includes a housing 16*d*, first contacts 20*d* and second contacts 40*d* that have the same general configuration of the apparatus 10*c* of FIGS. 16 and 17. In the sixth embodiment, the contact sets 14*d* of the switch assembly 12*d* are fit with contact pads, similar or identical to those of the apparatus 10*b* of FIG. 15, that are adapted to switch high current electricity.

The first contacts 20*d* include pad portions 22*d*, support portions 24*d* and connector portions 26*c* that are similar to the corresponding portions of the first contacts of the first embodiment. The second contacts 40*d* include pad portions 42*d*, actuator portions 44*d*, spring portions 46*d*, support portions 52*d*, and connector portions 54*d* similar to the corresponding portions of the second contacts of the first embodiment. The connector portions 26*d* and 54*d* of the first and second contacts 20*d* and 40*d* comprise compliant connectors similar or identical to those illustrated in the first embodiment.

According to the sixth embodiment, the housing 16*d* is constructed as a single piece of material, eliminating the cover, and leaving a base portion 100*d*. The housing 16*d*, i.e., the base portion 100*d*, supports the first and second contacts 20*d* and 40*d*. As shown in FIG. 17, the housing 16*d* may leave the actuator portions 44*d* and spring portions 46*d* of the second contacts 40*d* exposed. The first contacts 20*d* include deflectable tabs 500*d* that cooperate with the housing 16*d* to help connect the first contacts with the housing. The second contacts 40*d* include flange portions 502*d* that include deflectable tabs 504*d* that cooperate with the housing 16*d* to help connect the second contacts with the housing.

As shown in FIGS. 18 and 19, the pad portion 22d of the first contact 20d is fit with a first contact pad 460d. The pad portion 42d of the second contact 40d is fit with a second contact pad 470d. The first and second contact pads 460d and 470d help provide the high current switching capacity of the switch assembly 12d. The first and second contact pads 460d and 470d may have configurations and material constructions similar or identical to those of the embodiment of FIG. 15. The first and second contact pads 460d and 470d may be fastened to their respective pad portions 22d and 42d, by means similar or identical to those of the embodiment of FIG. 15. The switch assembly 12d of the sixth embodiment may be implemented in a normally closed switch assembly (shown) or a normally opened switch assembly similar to that illustrated in FIGS. 12A–12C.

Figure 21:
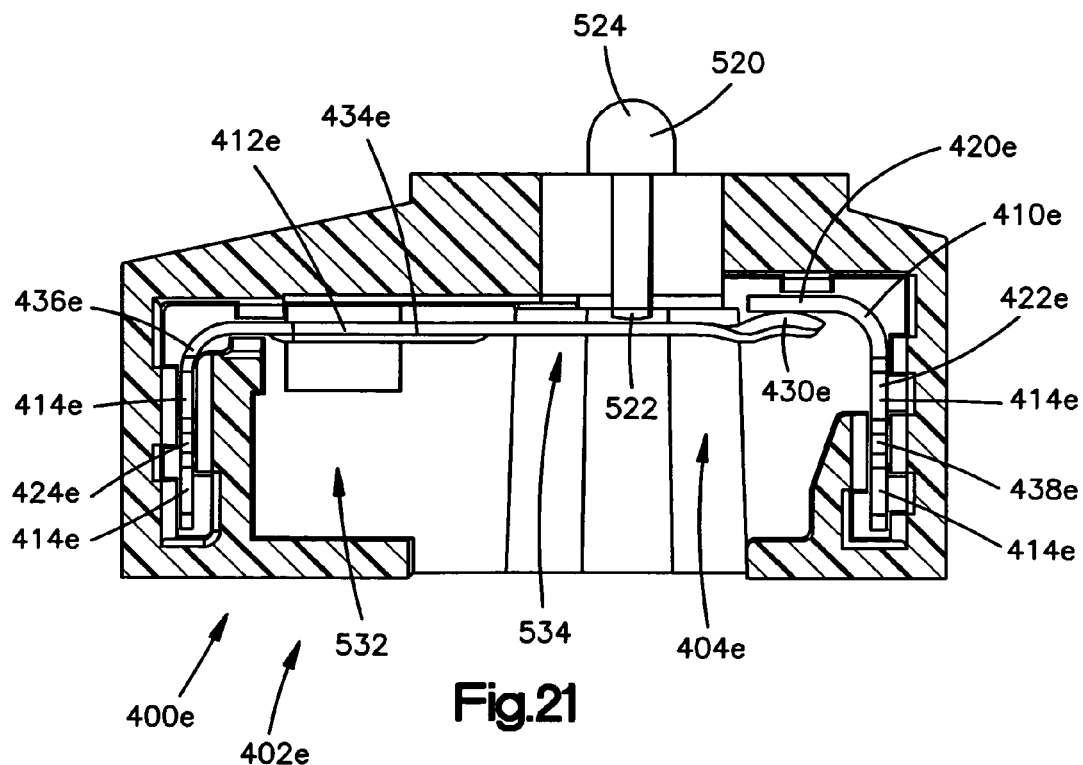
FIG. 21 is a partial sectional view of the switch assembly taken generally along line 21—21 of FIG. 20.

A seventh embodiment of the present invention is illustrated in FIGS. 20 and 21. The apparatus 400e of the seventh embodiment of the invention is similar to the apparatus 400 of the third embodiment of FIGS. 13 and 14. Accordingly, numerals similar to those of FIGS. 13 and 14 will be utilized in FIGS. 20 and 21 to identify similar components, the suffix letter "e" being associated with the numerals of FIGS. 20 and 21 to avoid confusion.

Referring to FIGS. 20 and 21, the apparatus 400e of the seventh embodiment comprises a side actuated switch assembly 402e. The switch assembly 402e of the seventh embodiment may, as shown, be a low current switch or may be fit with contact pads (not shown), similar or identical to those of the apparatus 10b of FIG. 15, that are adapted to switch high current electricity. Also, the side actuated switch assembly 402e is shown as including a single set of contacts 404e. The switch assembly 402e could, however, include multiple sets of contacts. The contacts 404e may be normally opened or normally closed contacts.

Referring to FIGS. 20 and 21, the contacts 404e include a first contact 410e and a second contact 412e. The first contact 410e includes a pad portion 420e, a support portion 422e, and a connector portion 424e. The second contact 412e includes a pad portion 430e, a spring portion 434e, a support portion 436e, and a connector portion 438e. The connector portions 424e and 438e each include compliant connector pins 414e. The compliant connector pins 414e are formed identical to and function in the same manner as the connector pins of the first and second embodiments.

According to the seventh embodiment, the switch assembly 402e does not include an actuator portion formed integrally with the second contact 412e. Instead, the switch assembly 402e includes an actuator 520, separate from the second contact 412e, that has a sliding fit with the housing 440e. The actuator 520 may be constructed of a variety of materials, such as molded plastic.

In the assembled condition, the actuator 520 has a portion 522 that engages the spring portion 434e of the second contact 412e. The actuator 520 also has a cam surface 524 that protrudes from the housing 440e. The spring portion 434e biases the actuator 520 in an upward direction as viewed in FIG. 21. The actuator 520 may be urged in a downward direction as viewed in FIG. 21 to cause the spring portion 434e to deflect in order to make or break the contacts 404e, depending on whether the contacts are normally open or normally closed.

The housing 440e may be constructed as a single piece of material, such as molded plastic, and has an open bottom portion 532 into which the first and second contacts 410e and 412e may be inserted in order to connect the contacts to the housing. The actuator 520 may also be inserted into the open bottom portion 532 so that it may be positioned a slot or opening 534 in which the actuator slides. The housing 440e may also include deflectable leg portions 530 that are insertable into apertures for connecting the switch assembly 402e to a part (not shown), such as a printed circuit board.

From the above description of the invention, those skilled in the art will perceive improvements, changes and modifications. Such improvements, changes and modifications within the skill of the art are intended to be covered by the appended claims.

Having described the invention, the following is claimed:

1. A switch assembly comprising:
a housing; and
a set of contacts supported by said housing, said set of contacts comprising a first contact and a second contact;
said first contact including a first pad portion supported in said housing and a first connector portion protruding from said housing, said first pad portion comprising a first contact pad having a precious metal alloy construction, said first connector portion comprising a first compliant connector;
said second contact including a second pad portion supported in said housing, said second pad portion comprising a second contact pad having a precious metal alloy construction, said second contact pad being movable relative to said first contact pad and engageable with said first contact pad, said second contact also including a second connector portion protruding from said housing, said second connector portion comprising a second compliant connector;
said first and second compliant connectors comprising spaced current carrying members that have surfaces that engage current carrying surfaces of a mounting body into which said compliant connectors are inserted to provide an electrical connection without the use of solder.

2. The switch assembly as recited in claim 1, wherein said second contact further includes a spring portion and an actuator portion, said spring portion being deflectable relative to said housing when a force acts on said actuator portion, said second pad portion being movable relative to said first pad portion when said spring portion deflects relative to said housing.

3. The switch assembly as recited in claim 2, wherein said set of contacts are normally closed, said spring portion biasing said second pad portion into engagement with said first pad portion, said spring portion being deflectable when a force acts on said actuator portion to an actuated condition wherein said second pad portion is disengaged from said first pad portion.

4. The switch assembly as recited in claim 2, wherein said set of contacts are normally opened, said spring portion biasing said second pad portion to disengage from said first pad portion, said spring portion being deflectable when a force acts on said actuator portion to an actuated condition wherein said second pad portion is engaged with said first pad portion.

5. The switch assembly as recited in claim 2, wherein actuator portion comprises a cam protruding from said housing, said cam having a cam surface.

6. The switch assembly as recited in claim 5, wherein said first and second connectors extend transversely from a bottom wall of said housing, said cam protruding from a top wall of said housing opposite said bottom wall.

7. The switch assembly as recited in claim 5, wherein said first and second connectors extend transversely from a bottom wall of said housing, said cam protruding from a side wall of said housing, said side wall extending transverse to said bottom wall.

8. The switch assembly as recited in claim 5, further comprising an actuator movable relative to said housing and said set of contacts, said actuator comprising at least one actuating member with at least one actuating portion movable into engagement with said cam surface to move said actuator portion and cause deflection of said spring portion which moves said second pad portion relative to said first pad portion.

9. The switch assembly as recited in claim 8, wherein said actuator comprises a rotary actuator rotatable relative to said housing and said set of contacts about an axis, said at least one actuating member being movable into engagement with said cam surface upon rotation of said rotary actuator to move said actuator portion and cause deflection of said spring portion which moves said second pad portion relative to said first pad portion.

10. The switch assembly recited in claim 8, comprising a plurality of sets of contacts, said actuator comprising a plurality of actuator members, each of said actuator members corresponding to one of said sets of contacts and including at least one actuating portion for actuating said corresponding one of said sets of contacts.

11. The switch assembly recited in claim 10, wherein said plurality of sets of contacts and said actuator form a multiplexed or encoded switch wherein said actuator members are arranged to actuate said sets of contacts in a plurality of predetermined combinations depending on the position of said actuator relative to said housing.

12. The switch assembly recited in claim 10, wherein said plurality of sets of contacts each include a first contact and a second contact, each of said first contacts being made individually as single pieces of electrically conductive material, said second contacts being made as one single piece of electrically conductive material.

13. The switch assembly as recited in claim 1, wherein said first contact and said second contact each are made from a single piece of electrically conductive material.

14. The switch assembly as recited in claim 13, wherein said first contact includes a latch portion formed from said single piece of electrically conductive material forming said first contact and said second contact includes a latch portion formed from said single piece of electrically conductive material forming said second contact, each said latch portion comprising a deflectable member having a spring bias, said latch portions being biased into engagement with respective portions of said housing to releasably latch onto said housing and help connect said first and second contacts to said housing.

15. The switch assembly as recited in claim 1, wherein each of said first and second compliant connectors comprises spaced retainer members insertable into a hole for receiving said compliant connectors, said hole having an inner side wall, said retainer members having outer surfaces that engage said inner side wall and form an interference fit with said hole when inserted in said hole, said retainer members deflecting toward each other when inserted in said hole, said retainer members having a spring bias that biases said retainer members against said inner side wall to frictionally engage said inner side wall.

16. The switch assembly as recited in claim 15, wherein each of said compliant connectors further comprises a cross member extending transverse to said retainer members, said cross members including portions engageable with a surface surrounding said hole to limit insertion of said retainer members in said hole.

17. The switch assembly as recited in claim 1, further comprising first and second contact pads constructed of a precious metal alloy, said first contact pad being fastened to said first pad portion and said second contact pad being fastened to said second pad portion.

18. The switch assembly recited in claim 1, wherein at least one of said first and second connector portions comprises a plurality of compliant connectors.

19. The switch assembly recited in claim 1, further comprising an actuator supported in said housing an movable relative to said contacts, said actuator having a portion in abutting engagement and a portion protruding from said housing, said actuator being movable to cause deflection of said second contact which causes actuation of said first and second contacts.

20. A switch assembly comprising:
a housing;
a first contact supported in said housing, said first contact comprising a compliant connector portion;
a first contact pad fastened to said first contact, said first contact pad being constructed of a precious metal alloy;
a second contact supported in said housing and movable relative to said first contact, said second contact comprising a compliant connector portion; and
a second contact pad fastened to said second contact, said second contact pad being constructed of a precious metal alloy;
said first and second compliant connector portions comprising spaced current carrying members that have surfaces that engage current carrying surfaces of a mounting body into which said compliant connector portions are inserted to provide an electrical connection without the use of solder.

21. The switch assembly recited in claim 20, wherein said first contact pad is constructed of a silver-nickel alloy and said second contact pad is constructed of a silver-tin oxide.

22. The switch assembly recited in claim 21, wherein said second contact further comprises an actuator portion for receiving a force for causing deflection of said second contact to move said second contact pad relative to said first contact pad.

23. The switch assembly recited in claim 20, further comprising means for fastening said first and second contact pads to said first and second contacts, said means for fastening comprising at least one of a stamped connection, a staked connection, a press-fitted connection, a riveted connection, a soldered connection, and a welded connection.

24. The switch assembly recited in claim 20, wherein said first and second contact pads are capable of switching electrical currents of up to about 14 amperes without arcing.

25. The switch assembly recited in claim 20, wherein said first contact pad has a cylindrical configuration with a flat first contact surface and said second contact pad has a domed configuration with a domed second contact surface, said first and second contact surfaces being engageable with each other to permit electrical current to flow between said first and second contact pads.

26. The switch assembly recited in claim 25, wherein said domed second contact surface provides a wiping action against said flat first contact surface when said switch assembly is actuated.

27. The switch assembly recited in claim 20, wherein said compliant connector portions of at least one of said first and second contacts comprise a plurality of compliant connector pins.

* * * * *